US010555405B2

(12) United States Patent
Malaugh et al.

(10) Patent No.: US 10,555,405 B2
(45) Date of Patent: Feb. 4, 2020

(54) SYSTEMS AND METHODS TO MANAGE THEMES IN LIGHTING MODULES

(71) Applicant: Hunter Industries, Inc., San Marcos, CA (US)

(72) Inventors: John Malaugh, San Diego, CA (US); Peter John Woytowitz, San Diego, CA (US)

(73) Assignee: Hunter Industries, Inc., San Marcos, CA (US)

(*) Notice: Subject to any disclaimer, the term of this patent is extended or adjusted under 35 U.S.C. 154(b) by 0 days.

(21) Appl. No.: 16/396,404

(22) Filed: Apr. 26, 2019

(65) Prior Publication Data
US 2019/0342978 A1 Nov. 7, 2019

Related U.S. Application Data

(60) Provisional application No. 62/667,321, filed on May 4, 2018.

(51) Int. Cl.
*H05B 37/00* (2006.01)
*H05B 37/02* (2006.01)
*H05B 33/08* (2006.01)

(52) U.S. Cl.
CPC ..... *H05B 37/0263* (2013.01); *H05B 33/0842* (2013.01); *H05B 37/0218* (2013.01)

(58) Field of Classification Search
CPC ............ H05B 33/0815; H05B 33/0818; H05B 41/2828; H05B 41/3921; H05B 41/3927; H05B 41/28; H05B 37/029; H05B 33/0803; H05B 37/0254; H05B 37/02
See application file for complete search history.

(56) References Cited

U.S. PATENT DOCUMENTS

| 5,471,119 | A | * | 11/1995 | Ranganath | ............ | H05B 37/02 |
| | | | | | | 315/294 |
| 2007/0139316 | A1 | | 6/2007 | Hyatt | | |
| 2010/0084985 | A1 | | 4/2010 | Woytowitz | | |
| 2013/0249429 | A1 | | 9/2013 | Woytowitz et al. | | |
| 2014/0335823 | A1 | * | 11/2014 | Heredia | ................... | H04L 51/38 |
| | | | | | | 455/411 |

OTHER PUBLICATIONS

International Search Report and Written Opinion dated Jul. 16, 2019 received in PCT/US2019/029494, filed Apr. 26, 2019.

* cited by examiner

Primary Examiner — Minh D A
(74) Attorney, Agent, or Firm — Knobbe, Martens, Olson & Bear, LLP

(57) ABSTRACT

A lighting system includes lighting fixtures and a lighting controller that sends commands and data over an AC power line to power and control the lighting fixtures. Lighting themes are uniquely programmable color and intensity that are applied to a collection of lighting groups to achieve different lighting modes instantly, without the delay that programming each lighting fixture individually incurs. The groups of lighting modules receive theme lighting information over the power line and store the theme information in memory. The lighting controller sends a single command to the collections of the lighting groups to apply the theme. Each lighting module retrieves and applies the theme information.

20 Claims, 20 Drawing Sheets

Instant Themes – Learn approach "B"

SYSTEMS AND METHODS TO MANAGE THEMES IN LIGHTING MODULES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Lighting systems can include a plurality of lights connected to a transformer. There may be one or more "legs" or sets of wires coming out of the transformer, each connected to at least one lighting module. A timer box connects to the transformer. The user programs the on/off times and all of the lights energize in unison, such that all lighting modules connected to a particular transformer turn ON or OFF together regardless of which leg they are on.

Some manufacturers can provide lighting systems with addressable lighting modules. The timer box of the traditional lighting system is replaced with a lighting controller that supplies the lighting modules with a separate power and data signal. Each lighting module has an address and is independently addressable by the lighting controller via the data signal. These networked lighting systems provide the lighting modules with two sets of wires instead of the one or more legs. One set provides a power signal to illuminate the lights, lamps, or LEDs and a second set provides the lighting module with a data signal. The user programs the lighting controller to turn-on and turn-off lights of a lighting module at individual addresses such that a single lighting module can turn-on or turn-off independently of the other lighting modules in the network, when, for example, the data signal carries the address of a particular lighting module.

SUMMARY

The innovations described in the claims each have several aspects, no single one of which is solely responsible for the desirable attributes. Without limiting the scope of the claims, some prominent features of this disclosure will now be briefly described.

A lighting system includes lighting modules and a lighting controller that sends commands and data over an AC power line to power and control the lighting modules. The lighting system can be an indoor lighting system for commercial or residential use. The lighting system can be an outdoor lighting system for commercial or residential use. The AC power line can be low voltage, such as approximately ±12 VAC or the like. The AC power line can be line voltage or approximately line voltage, such as, for example but not limited to 100 VAC 50 Hz or 60 Hz, 110 VAC 50 Hz or 60 Hz, 115 VAC 50 Hz or 60 Hz, 220 VAC 50 Hz or 60 Hz, 230 VAC 50 Hz or 60 Hz, 240 VAC 50 Hz or 60 Hz and the like. The AC power line from the lighting controller can be a two-wire path that carries the power/data signal to the lighting modules.

The lighting modules can be uniquely addressable by the lighting controller. The lighting modules can be grouped into lighting groups or zones and each group or zone of lighting modules can be addressable. Each group or zone can include one or more lighting modules. Each lighting module can include one or more lamps. A lamp can be an LED. The lighting module can control one or more of ON/OFF times, color, color temperature, and intensity of the one or more lamps based on the commands and data received over the AC power line from the lighting controller.

Lighting themes are uniquely programmable ON/OFF, color, color temperature, and/or intensity that are applied to a collection of lighting groups to achieve different lighting modes instantly, without the delay that programming each lighting fixture individually incurs. The groups of one or more lighting modules receive theme lighting information over the AC power line and each lighting module stores the theme information in memory. The lighting controller sends a single command to one or more lighting groups to apply the theme. Each lighting module of the one or more lighting groups retrieves and applies the theme information.

Aspects of the disclosure are directed to a system to manage lighting themes in a plurality of lighting modules. The system comprises a lighting controller configured to receive AC power from a primary AC power source and user input indicative of lighting theme information and generate a data encoded power signal to provide power and encoded messages based on the lighting theme information over a two-wire network. The lighting theme information includes a request to implement a lighting theme of a plurality of lighting themes. The system further comprises a plurality of lighting modules, where each lighting module of the plurality of lighting modules is configured to receive the data encoded power signal over the two-wire network. Each lighting module includes at least one lamp, lamp driver circuitry, a microprocessor, and memory storing instructions, that when executed by the processor, configure the lighting module to decode at least a portion of the encoded message. The first portion includes an indication of the requested lighting theme. The instructions further configure the lighting module to retrieve one or more stored settings for the at least one lamp that are associated with the requested lighting theme from the memory and execute the retrieved settings. The lighting theme information can further comprise commands based on the user input to implement the requested lighting theme. The instructions can further configure each lighting module of the plurality of lighting modules to decode a second portion of the encoded message after executing the retrieved settings associated with the requested lighting theme. The second portion of the encoded message can include the commands based on the user input.

In an embodiment, executing the retrieved settings causes each lighting module to apply the retrieved settings to the at least one lamp. In an embodiment, the instructions further configure each lighting module to compare the commands based on the user input from the decoded second portion with the one or more stored settings to determine changes in the requested lighting theme. In an embodiment, the instructions further configure each lighting module to revise the one or more stored settings based on the determined changes in the requested lighting theme. In an embodiment, the instructions further configure each lighting module to execute the commands based on the user input from the decoded second portion when the comparison indicates changes in the requested lighting theme. In an embodiment, the instructions further configure each lighting module to replace the one or more stored settings in the memory with the commands based on the user input from the decoded second portion.

In an embodiment, the first portion further includes an indication to apply the requested lighting theme. In an embodiment, the at least one lamp is an LED, an incandescent light, a low voltage light, or a line voltage light. In an embodiment, the commands provide indications to control one or more of ON/OFF times, color, color temperature, or intensity of the at least one lamp.

Other aspects of the disclosure are directed to a lighting module comprising at least one lamp, a microprocessor, and memory storing instructions, that when executed by the microprocessor, cause the lighting module to receive a data encoded power signal over a two-wire network. The data encoded power signal provides power and encoded messages. The encoded messages include lighting theme information indicative of a lighting theme of a plurality of lighting themes. The instructions further cause the lighting module to decode at least a portion of the received message, where the at least a portion includes an indication of the lighting theme, and execute one or more settings stored in the memory for the at least one lamp and associated with the lighting theme based on the indication of the lighting theme. The instructions can further cause the lighting module to decode a second portion of the encoded message after executing the stored settings associated with the lighting theme. The second portion of the encoded message can include commands associated with the lighting theme information.

In an embodiment, the instructions further cause the lighting module to compare the commands from the decoded second portion with the stored settings to determine changes in the lighting theme. In an embodiment, the instructions further cause the lighting module to store in the memory the determined changes in the lighting theme. In an embodiment, the instructions further cause the lighting module to implement the commands from the decoded second portion when the comparison indicates changes in the lighting theme. In an embodiment, each lighting module of the plurality of lighting modules is addressable. In an embodiment, the at least one lamp is an LED, an incandescent light, a low voltage light, or a line voltage light.

Other aspects of the disclosure are directed to a method to manage lighting themes in lighting modules. The method comprises receiving at a plurality of lighting modules a data encoded power signal over a two-wire network. The data encoded power signal provides power and encoded messages. The encoded messages includes lighting theme information indicative of a lighting theme of a plurality of lighting themes. The method further comprises decoding, with at least one lighting module of the plurality of lighting modules, at least a portion of the received message. The first portion includes an indication of the lighting theme. The at least one lighting module comprises memory and at least one lamp. The method further comprises applying, with the at least one lighting module, one or more settings stored in the memory for the at least one lamp and associated with the lighting theme. The method can further comprise decoding, with the at least one lighting module, a second portion of the encoded message after applying the stored settings associated with the lighting theme. The decoded second portion can include commands associated with the lighting theme.

In an embodiment, the commands provide indications to control one or more of ON/OFF times, color, color temperature, or intensity of the at least one lamp. In an embodiment, the method further comprises comparing, with the at least one lighting module, the commands from the decoded second portion with the stored settings to determine changes in the lighting theme. In an embodiment, the method further comprises applying, with the at least one lighting module, the commands from the decoded second portion when the comparison indicates changes in the lighting theme. In an embodiment, the method further comprises over-writing, with the at least one lighting module, the stored settings in the memory with the commands from the decoded second portion when the comparison indicates changes in the lighting theme.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

These drawings and the associated description herein are provided to illustrate specific embodiments and are not intended to be limiting.

DETAILED DESCRIPTION

Figure 1:
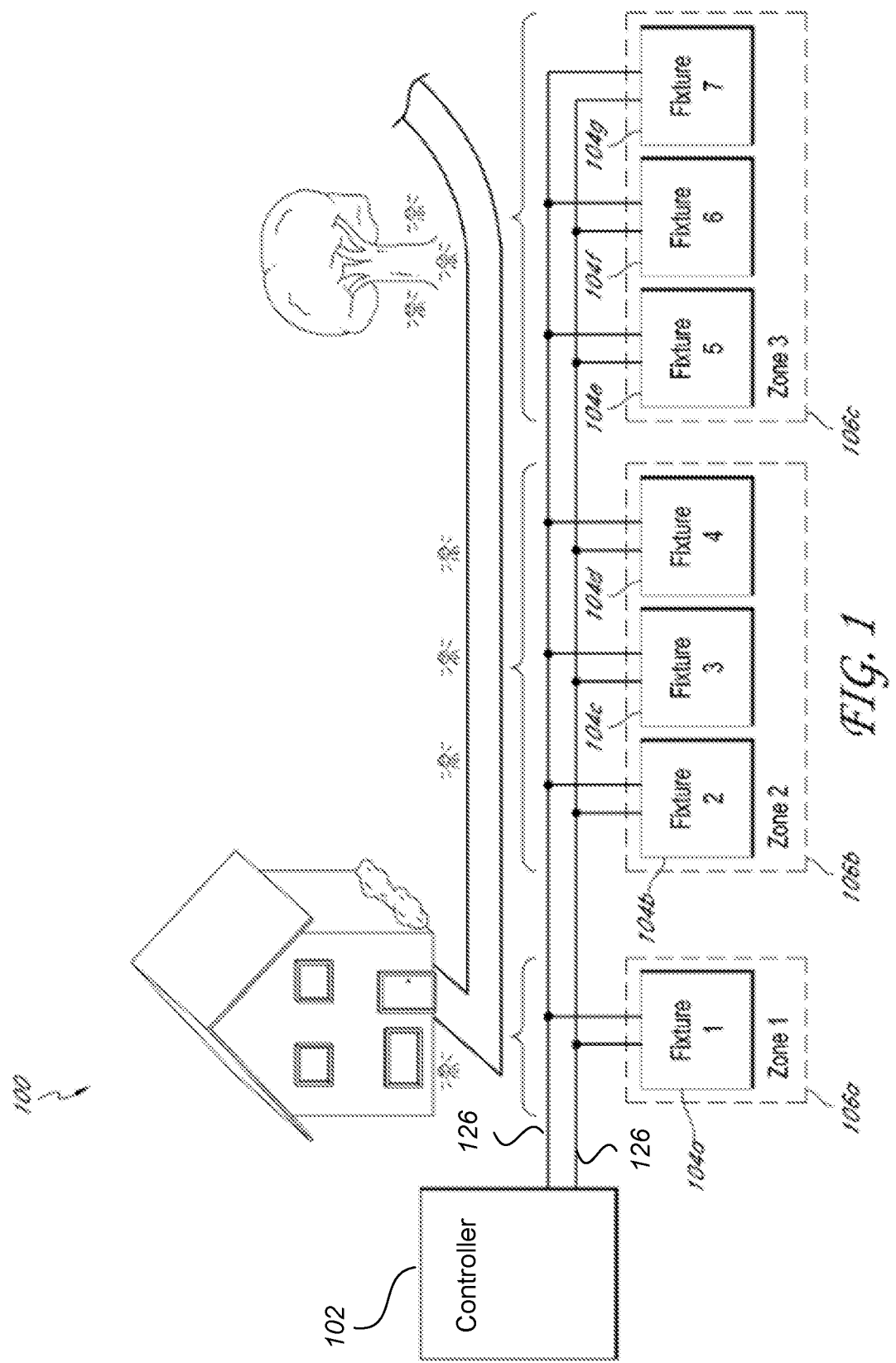
FIG. 1 illustrates an exemplary lighting system, according to certain embodiments.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Aspects of this disclosure relate to lighting modules, also referred to as lighting fixtures, which receive power and theme data from a lighting controller over a two-wire path. The lighting modules can include memory to store the theme data. When the lighting modules receive a command from the lighting controller to apply the theme, each addressed lighting module retrieves the theme data and controls one or more of ON/OFF times, color, color temperature, and intensity of its lights, lamps, or LEDs according the retrieved theme data.

Some lighting systems send power to lighting modules over a first set of wires and send data to the lighting modules over a second set of wires. Other lighting systems send power to the lighting modules over a first set of wires and send data over a radio frequency (RF) communication system. Aspects of this disclosure use a two-wire command/data path to send power and data to the lighting modules. Advantageously, the two-wire path eliminates the need for the second set of wires to be wired to each lighting module, which results in a cost savings. Further, the two-wire path eliminates the need to implement an RF receiver in each lighting module, which also results in a cost savings. The lighting system including the two-wire path provides flexibility to reprogram one or more of the ON/OFF times, color, color temperature, and intensity for one or more groups of one or more lighting modules.

In some aspects disclosed herein, the lighting modules can be daisy-chained to the AC power line, which can be the house or mains wiring. This further reduces wiring costs and adds wiring flexibility when installing the lighting system.

FIG. 1 illustrates an exemplary lighting system 100. The lighting system 100 comprises a lighting controller 102 in communication with a plurality of lighting fixtures or modules 104 through a two-wire path 126. The lighting controller 102 can include a power supply and an operator interface. The lighting fixtures 104 are grouped into zones 106, which are also referred to as groups.

In the example illustrated in FIG. 1, zone 1 106a comprises lighting fixture 1 104a, which provides illumination to a portion of the house exterior. Zone 2 106b comprises lighting fixtures 2, 3, 4 104b, 104c, 104d, respectively, which illuminate the path, while zone 3 106c comprises lighting fixtures 5, 6, 7 104e, 104f, 104g, respectively, which provide accent lighting for the tree. In other embodiments, the lighting system 100 can be configured with more or less zones 106 and/or with more or less lighting fixtures 104 in each zone 106. While FIG. 1 illustrates an outdoor lighting system, the lighting system 100 can be an indoor lighting system for a residence or for a commercial application.

Typically, the lighting fixtures 104 in each zone 106 turn ON or OFF together, but unlike some traditional lighting systems, each zone 106 can be controlled independently of the other zones 106. In one example for the lighting system 100 illustrated in FIG. 1, zone 1 106a turns ON at dusk and turns OFF at dawn to illuminate the front door of the house. For Halloween, the front door can be illuminated with orange light and on Valentine's Day, the front door can be illuminated with red light. Zone 2 106b turns ON at dusk and turns OFF at 9 PM to illuminate the path. The intensity is set to the maximum to provide better illumination of the path. Finally, zone 3 turns ON at 7 PM and turns OFF at 10 PM to provide accent lighting in the yard. The accent lighting intensity can be set at 30%.

In one embodiment, the lighting system 100 is a residential outdoor lighting system. In other embodiments, the lighting system 100 is used for outdoor commercial purposes to illuminate the outside of hotels, golf courses, amusement parks, and the like, and for indoor commercial purposes to illuminate hotel interiors, office building interiors, airport terminals, and the like. In further embodiments, the lighting system 100 is used to illuminate housing developments. In yet further embodiments, the lighting system 100 is used to illuminate art work in residences, in museums, or the like. Many possibilities exist for the lighting system 100 to one skilled in the art from the disclosure herein.

The lighting controller 102 receives AC power from a primary AC power source and addresses/data/commands/theme information from a user and provides a data encoded power waveform, also indicated as a data encoded power signal, to the plurality of lighting fixtures 104 through the two-wire path 126.

The user can input the addresses/data/commands associated with the theme information to control the lighting functions for one or more groups or zones of lighting modules. The lighting functions can include, for example, one or more of timing control, dimming, brightness, color, color temperature, hue, zone allocation, intensity, and the like. In some aspects, the lighting controller 102 includes an operator interface panel and the user inputs the theme information through the operator interface panel.

In one aspect, the operator interface panel can include operator controls, such as selection buttons, knobs, and the like, which the user uses to input the desired theme information to the lighting system 100, and displays and indicators to provide feedback to the user. The operator interface panel can further include a computer and its associated memory. The microprocessor interfaces with the operator controls to store the theme information in its memory and to send the theme information to be encoded onto the power waveform. The microprocessor further interfaces with the displays and indicators to display information received from the lighting controller 102. The operator interface can be buttons, virtual icons or buttons on a touch screen, voice controlled or any user interface recognizable to an artisan from the disclosure herein.

In another aspect, the lighting system 100 can be accessed remotely by devices, such as laptops, computers, smart devices, smartphones, web-enabled automobiles, and the like. For example, the lighting system can include a mobile carrier network module which electrically couples to the lighting controller 102 and communicates with the World Wide Web via a mobile carrier's network. The user can use the devices to send the theme information to the lighting system 100. In one aspect, firmware either inside the lighting controller 102 or in the module serves up a webpage. In another aspect, an application is provided for application-enabled devices, such as the laptops, computers, smart devices, smartphones, web-enabled automobiles, and the like. The user interacts with the application, and the application communications with the module via the World Wide Web. In a third aspect, a web based application is hosted on a server on the World Wide Web. The user interacts with this webpage using the devices which include a web browser and the application communicates with the lighting controller 102.

U.S. Pat. Nos. 8,773,030 and 9,609,720 set forth details relating to lighting systems including lighting controllers and lighting modules. U.S. Pat. No. 8,773,030 titled "Low Voltage Outdoor Lighting Power Source and Control System," issued on Jul. 8, 2014, relates to low voltage lighting systems and includes figures and corresponding written disclosure describing illustrative embodiments of the same. U.S. Pat. No. 9,609,720 titled "Low Voltage Outdoor Lighting Power Source and Control System," issued on Mar. 28, 2017, relates to systems and methods for providing power and data to lighting devices and includes figures and corresponding written disclosure describing illustrative embodiments of the same. U.S. Pat. Nos. 8,773,030 and 9,609,720 are hereby incorporated herein by reference in their entireties and considered a part of this specification.

FIGS. 2A-2H illustrate various data encoded power waveforms that provide power and data to the lighting modules 104 via the two-wire path 126. The data encoded power waveforms can be low voltage, such as ±12 VAC, high voltage, such as 110 VAC, 120 VAC, and the like. The waveforms can be square waves, sinusoidal waves, and the like. The data can be phase modulated, amplitude modulated, or frequency modulated onto the power waveform. Examples of data encoding techniques that can be used to encode the data onto the power waveform are, but not limited to frequency shift keying, Manchester encoding, return to zero (RZ), Nonreturn to Zero-Level (NRZ-L), Nonreturn to Zero Inverted (NRZI), Bipolar Alternate Mark Inversion (AMI), Pseudoternary, differential Manchester, Amplitude Shift Keying (ASK), Phase Shift Keying (PSK, BPSK, QPSK), and the like. In an embodiment, the data encoded power waveform comprises a sinusoidal waveform between zero crossings.

Figure 2A:
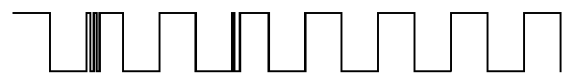
FIGS. 2A-2H depicts exemplary data encoded power waveforms for transmission along the two-wire path, according certain embodiments.
Figure 2B:
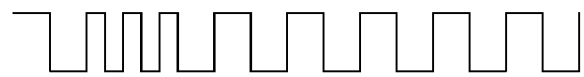
Figure 2C:
Figure 2D:
Figure 2E:
Figure 2F:
Figure 2G:
Figure 2H:

For example, FIGS. 2A-2C illustrate frequency encoded square waveforms; FIG. 2D illustrates a frequency encoded sinusoidal waveform, FIGS. 2E-2G illustrate sinusoidal waveforms encoded with a delay; and FIG. 2H illustrates a phase modulated sinusoidal waveform. FIGS. 2A-2H are non-limiting examples of data encoded power waveforms that can be provided by the lighting controller 102 via the two-wire path 126 to the lighting modules 104.

Figure 3:
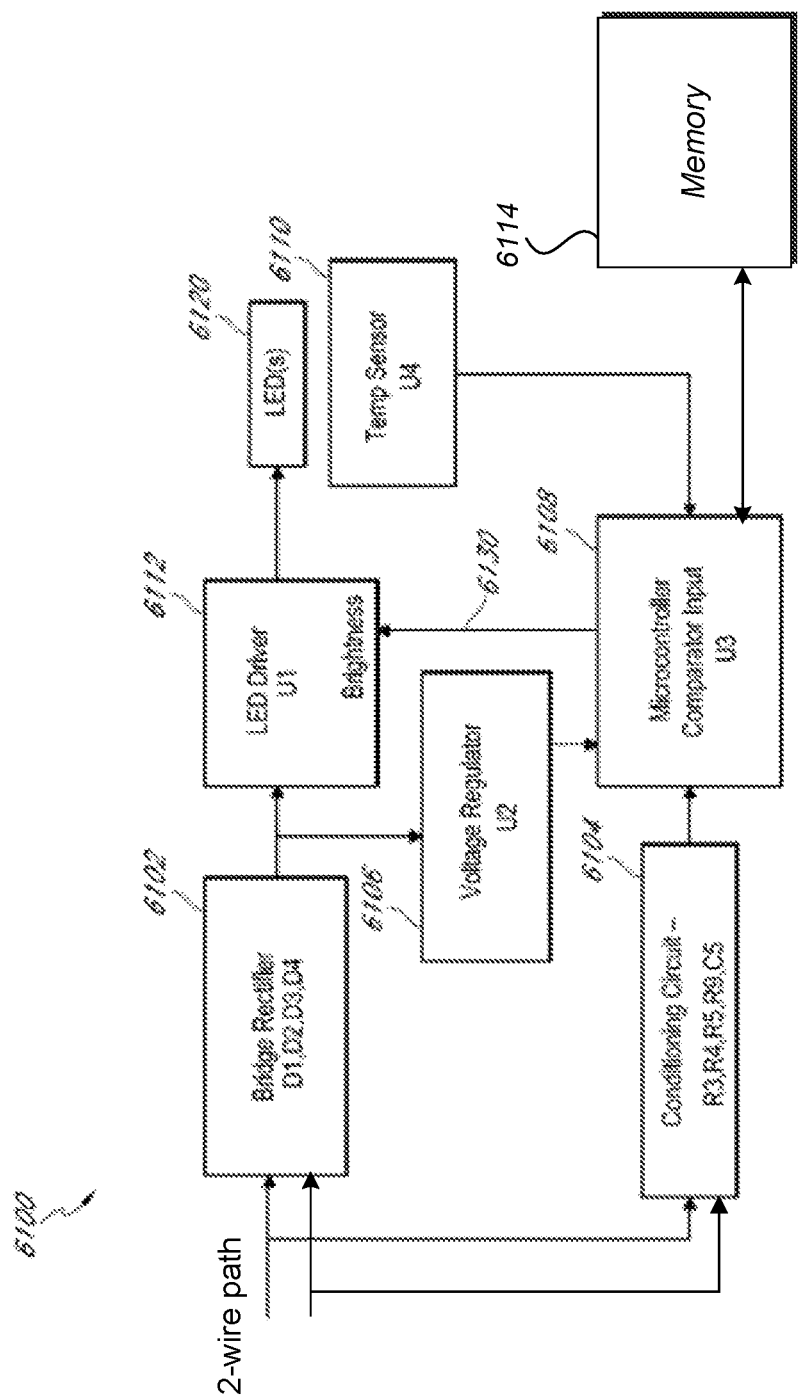
FIG. 3 is a block diagram of an exemplary single channel lighting module including memory to store theme information, according to certain embodiments.

FIG. 3 is a block diagram of an exemplary single channel lighting module 6100 that can be used with the lighting controller 102 that is capable of encoding data onto a low voltage power line. The illustrated lighting module 6100 receives a data encoded low voltage power waveform and comprises a bridge rectifier 6102, a conditioning circuit 6104, a voltage regulator 6106, a microcontroller 6108, a temperature sensor 6110, an LED driver 6112, and one or more lamps 6120. In the illustrated embodiment, the lamps 6120 comprise LEDs. In other embodiments, the lamps 6120 can be other light emitting devices, such as, for example, incandescent bulbs, florescent bulbs, or the like.

The bridge rectifier 6102 receives the encoded power waveforms, from the lighting controller 102. The bridge rectifier 6102 comprises a plurality of diodes, such as, for example, Schottky diodes, part number SBR2A40P1 available from Diodes Inc., or the like. The bridge rectifier 6102 converts an input signal of any polarity into a DC signal to power the other circuits on the lighting board. This DC signal is fed into the LED Driver 6112, which can be a driver integrated circuit, part number AL8805 available from Diodes Inc., or an equivalent. The driver integrated circuit uses an efficient Buck Switching topology to generate a regulated output current which is used to power the LED(s) 6120. In an embodiment, the LED 6120 can be a high-power LED, such as, for example, a CREE XP-E or an equivalent.

The DC voltage output from the bridge rectifier 6102 is also used to create a regulated logic supply voltage from the voltage regulator 6106. In an embodiment, the voltage regulator 6106 can be a 3-Volt regulator, such as, for example, part number TPS71530 available from Texas Instruments, or the like.

The voltage regulator 6106 supplies power to the microcontroller 6108, such as, for example, part number PIC16F1824 available from Microchip Technology, or the like. The microcontroller 6108 and associated firmware comprise a receiver for the data being sent from the lighting controller 102. The illustrated lighting module 6100 further comprises memory 6114, which can be included in the microcontroller 6108, or can be external to the microcontroller 6108. The memory 6114 can store one or more of the firmware and the theme information.

A conditioning network comprising a plurality of resistor and capacitors couples data from lighting controller 102 to the microcontroller's comparator input while simultaneously limiting current into the microcontroller 6108. The output of the comparator (within the microcontroller 6108) is used to determine the nature of the data. The microcontroller 6108 then generates a signal 6130 which is coupled to the LED Driver 6112. This signal 6130 is used to vary the intensity of the light 6120 based on data received from the power supply 302.

In an embodiment, part of the data received is an address that is used to determine if the information being sent is intended for this light 6120, as each light can have a unique address. In other embodiments, it is also possible for certain commands to be intended for lighting groups or zones, such as zones 106a, 106b, and 106c. A group may be defined as a certain type of light, for instance, a path light, or a group may be all lights in a certain location. In yet other embodiments, commands may be intended for all lights 6120. Therefore, using this addressing technique, commands may affect an individual light, a group of lights, or all lights. In another embodiment, data encoded power waveform from the lighting controller 102 communicates an intensity pattern to the light 6120. This could be a pre-orchestrated pattern of varying intensities, for example. In an embodiment, the pattern may be "canned" or preset inside the lighting fixture, or for the details of it to be communicated from the lighting controller 102. This feature may be useful, for example, for lighting themes which may be synchronized to music.

The output of a comparator (within the microcontroller 6108) can also include the phase information for the incoming data encoded power waveform. In some aspects, this is important because the brightness of the LED 6120 is determined by a pulse width modulation (PWM) waveform from the microcontroller 6108. Unless this PWM waveform is synchronized with the incoming power, visible "flickering" may be seen as these two signals (power and PWM) are "mixed". Therefore it is important for the microcontroller 6108 to know the phase of the incoming power, and periodically reset a PWM counter in order to synchronize the PWM signal to the power waveform.

In some aspects, the microcontroller 6108 protects the lighting module 6100 from overheating. In general, high-power LEDs 6120 generate heat. In an embodiment, the lighting module 6100 comprises the temperature sensor 6110 on the printed circuit board of the lighting fixture 6100. The temperature sensor 6110 can be, for example, part number MCP9700 available from Microchip Technology, or the like. The temperature sensor's output is an analog voltage which is read by an A/D converter in the microcontroller 6108. The microcontroller 6108 uses this information to "throttle back" the power to the LED 6120 when the temperature rises above threshold temperature. The threshold temperature can be chosen to keep the internal junction temperature of the LED 6120 within its rated specification. The throttling is achieved the same way the intensity variation is achieved, as described above.

Figure 4:
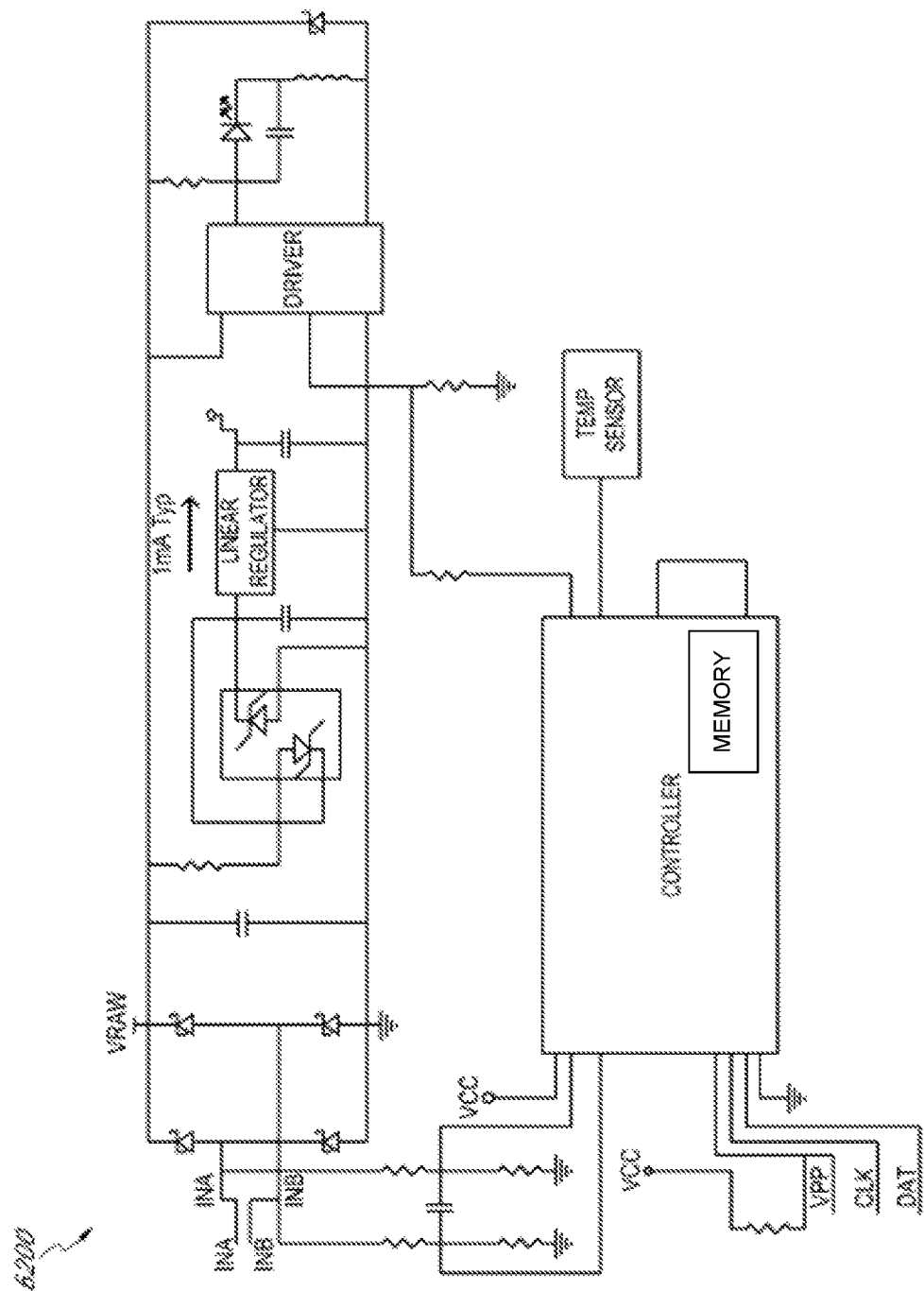
FIG. 4 is an exemplary schematic diagram of a single channel lighting module including memory to store theme information, according to certain embodiments.

FIG. 4 is an exemplary schematic diagram of a single channel lighting module 6200, according to one embodiment. In the illustrated single channel lighting module 6200, the microcontroller is shown with internal memory that stores the theme information decoded from the data encoded power waveform from the lighting controller 102.

Other lighting devices can be used with a lighting controller 102 that is capable of encoding data on the primary AC power line. The architecture of this line voltage lighting module can be similar to the low voltage version 6100, 6200 disclosed above but uses components that are rated at a voltage sufficiently higher than the line voltage. For example, diodes D1, D2, D3, and D4 with sufficient ratings can be 1N4007 silicon rectifier diodes from Diodes Inc., and the like. In another example, the Zener diode clamping circuit (shown in FIG. 4) preceding the linear regulator U2 should be appropriately sized to handle the larger input voltage. In other embodiments, other methods to step down the rectified line voltage to a voltage usable by the microcontroller U3, such as switching converters and the like, can be used. Further, the conditioning circuit R3, R4, R5, R9, C5 should be modified to scale the input voltage for use by the microcontroller U3. An example of the LED Driver U1 that can accept a high input voltage is the AL9910 from Diodes Inc. Because of the high input voltage, these lighting modules use an external MOSFET rather than an integral MOSFET as described in the AL8805 for the low voltage case.

In other embodiments of the line voltage lighting module, an optional power factor correction IC can be placed between the full wave bridge D1, D2, D3, D4 and the rest of the circuit. A suitable device, for example, is an UCC28810 IC available from Texas Instruments, or the like. Advantageously, these devices drive the power factor of nonlinear loads, such as LED drivers, closer to unity.

In a further embodiment, the line voltage lighting modules comprise an LED driver U1 that could be controlled from a microcontroller U3 having an input comprising a scaled and conditioned version of the input voltage. The microcontroller U3 deciphers the encoded data, and affects the LED driver U1 accordingly.

Figure 5:
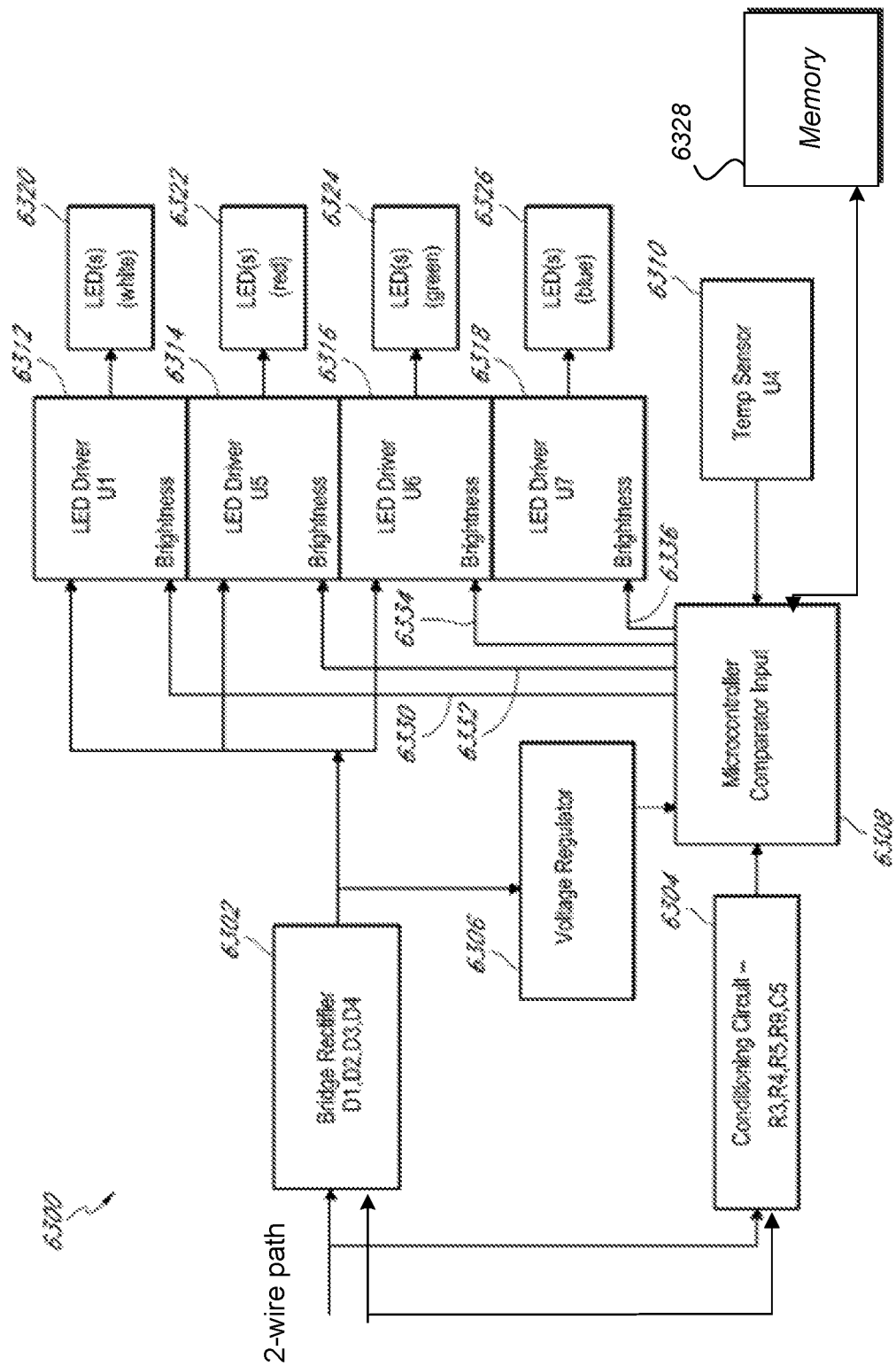
FIG. 5 is a block diagram of an exemplary multichannel lighting module including memory to store theme information, according to certain embodiments.

In some aspects, lighting modules can drive a plurality of LEDs 6120. FIG. 5 is a block diagram of an exemplary multichannel lighting module 6300, which receives the data encoded power waveform from the lighting controller 102, decodes and performs the encoded commands, and uses the waveform for power. The illustrated lighting module 6300 comprises a bridge rectifier 6302, a conditioning circuit 6304, a voltage regulator 6306, a microcontroller 6308, a temperature sensor 6310, a plurality of LED drivers 6312, 6314, 6316, and 6318, and one or more LEDs 6320, 6322, 6324, and 6326. Each LED 6320, 6322, 6324, and 6326 may comprise one or more LEDs. The illustrated lighting module 6300 is a four channel lighting module, although other lighting modules may have more or less than four channels.

The bridge rectifier 6302, the conditioning circuit 6304, and the voltage regulator 6306 are similar in construction and operation to the bridge rectifier 6102, the conditioning circuit 6104, and the voltage regulator 6106 of the single channel lighting fixture 6100, respectively, as described above.

The four channel lighting module 6300 approximately quadruples the LEDs 6120 and LED driver 6112 on the single-channel lighting module 6100 with respect to the LEDs 6320, 6322, 6324, 6326 and the LED drivers 6312, 6314, 6316, 6318 for the four channel lighting fixture 6300. Thus each LED 6320, 6322, 6324, 6326 and each LED driver 6312, 6314, 6316, 6318 is similar in construction and operation to the LED 6120 and LED driver 6112 of the single channel lighting module 6100, respectively, as described above. Similarly, the microcontroller 6308 is similar in construction and operation to the microcontroller 6108 of the single channel lighting module 6100, as described above, except the microcontroller 6308 controls multiple channels instead of a single channel. In conjunction with the microcontroller 6308, the LED drivers 6312, 6314, 6316, and 6318 allow independent brightness control to four separate channels of LEDs. In a similar manner to microcontroller 6108, which generates the signal 6130 to control the intensity of LED 6120, microcontroller 6306 generates signals 6330, 6332, 6334, and 6336 to control the intensities of LEDs 6320, 6322, 6324, 6326, respectively. Each string of LEDs 6320, 6322, 6324, 6326 may comprise one or more LEDs. In other embodiments, this approach could be used to add more channels, or to change the number of LEDs in each string. In yet other embodiments, each LED 6320, 6322, 6324, 6326 may comprise several LED dies in a single package with a single lens, such as, for example, the CREE MC series of LEDs or the like.

Like the single-channel lighting module 6100, the illustrated lighting module 6300 uses the microcontroller 6308 to receive information from the lighting controller 102 and vary one or more of the LED ON/OFF timing, color, color temperature, and intensity based on this information. Since each of the four channels can be independently controlled, the commands to the four channel lighting fixture 6300 can include one or more of ON/OFF timing, color, color temperature, and intensity level information for each of the four channels.

Advantageously, in the multi-channel lighting module 6300, each channel may comprise a different color LED 6320, 6322, 6324, and 6326. For instance, if the first channel comprises one or more white LEDs, the second comprises one or more red LEDs, the third comprises green LEDs and the fourth comprise blue LEDs, then a plurality of lighting colors could be generated by mixing the intensities in the correct ratios. For example, the white channel could create a brighter white light for general lighting needs, or slightly "wash out" the color created by the red, blue, and green LEDs. This allows the user to formulate any color of light desired, and to vary that color and/or hue, either abruptly, or by a gradual blending technique. Lights could also be modified to match a particular season or holiday. For instance, red, white, and blue colored lights could be use on the 4th of July; red and green lights could be used around Christmas; and orange lights could be used for Halloween and Thanksgiving.

In another embodiment, the multi-channel lighting fixture 6300 allows the user to adjust the shade of a white light. Perhaps, for example, the user is more of a "purest" and simply prefers white lights. The term "white" encompasses a wide range of shades from the more "blue" cool whites, to the more "yellow" warm whites. White LEDs by their nature are cool white. This is because a white LED is actually a blue LED with phosphor coating that glows white. For most people this is acceptable, but for some, a warmer white may be desired. If one of the multi-channels were populated with a red or yellow LED, then by varying the intensity of that channel, the user could vary the warmth, or color temperature as it is technically called, of the light. This is also important because different color temperatures are better at illuminating certain subject hues than others.

Control of individual lights or individual channels of LEDs within a single light is advantageous. Even more advantageous is to be able to achieve this control using the same set of wires 126 that deliver power to the light. Lastly, integrating the decoder circuitry 6302, 6304, 6306, and 6308, the driver circuitry 6312, 6314, 6316, and 6318, and the temperature throttling 6310 on a single printed circuit board within the lighting module 6300, results in a highly integrated, self-contained intelligent lighting module 6300 which is no harder to install than a tradition lighting module.

Figure 6:
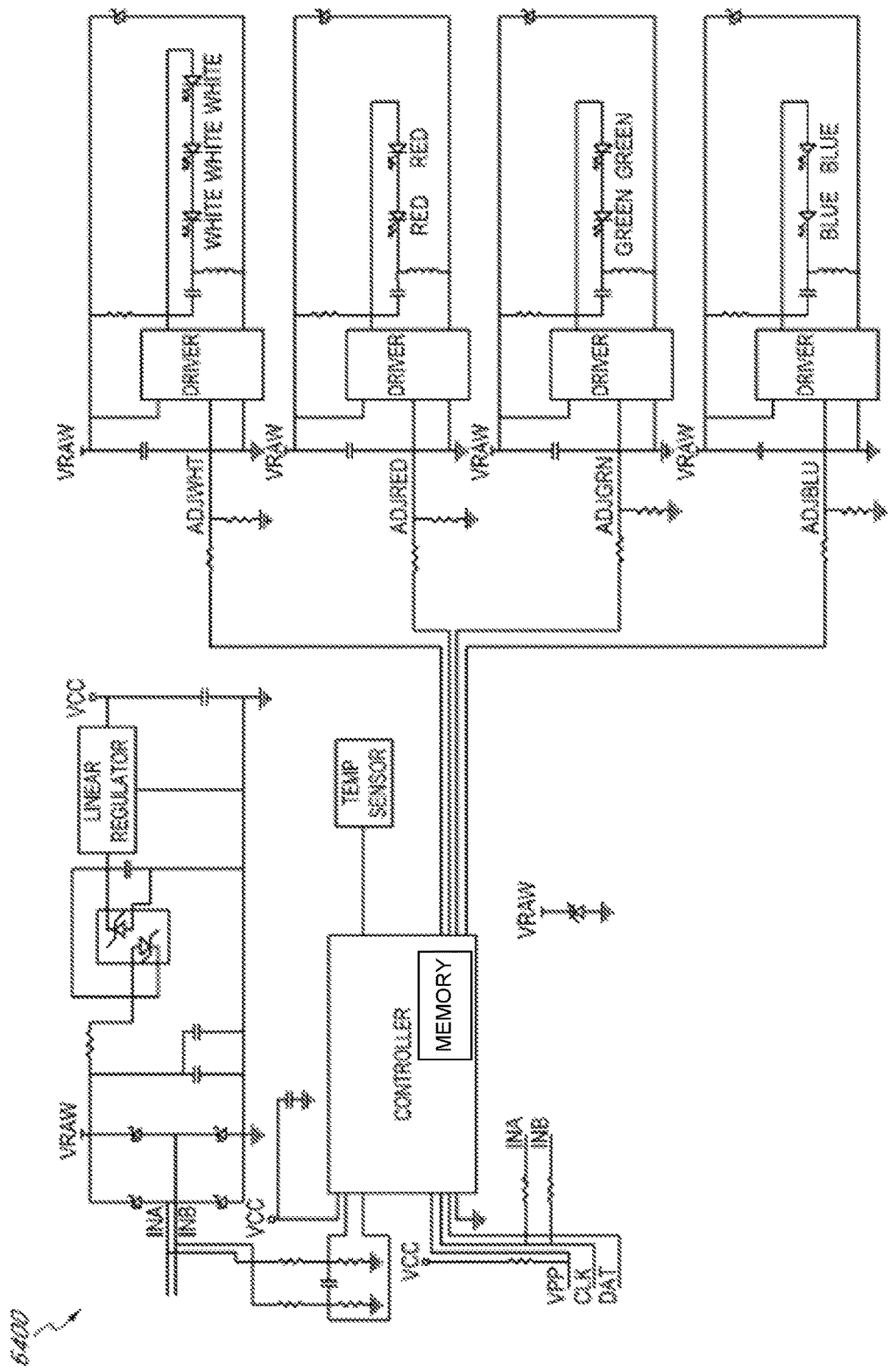
FIG. 6 is an exemplary schematic diagram of a multi-channel lighting module including memory to store theme information, according to certain embodiments.

FIG. 6 is an exemplary schematic diagram of a multi-channel lighting module 6400, according to one embodiment. In the illustrated four channel lighting module 6200, the microcontroller is shown with internal memory that stores the theme information decoded from the data encoded power waveform from the lighting controller 102.

Figure 7A:
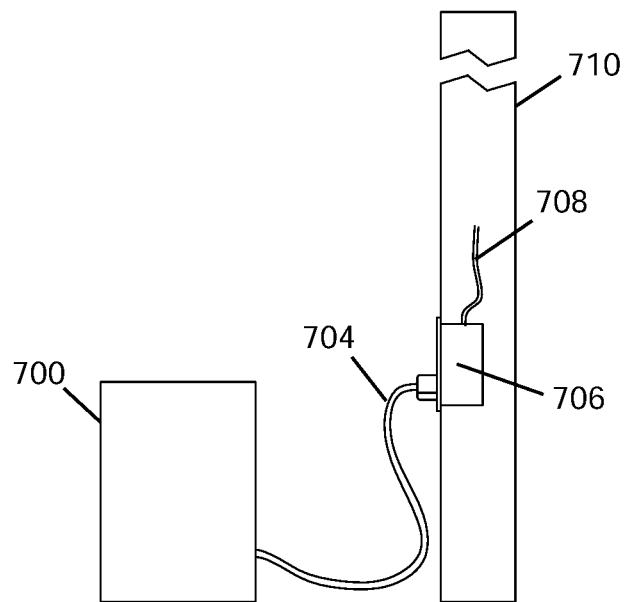
FIG. 7A illustrates a portable lamp plugged into a wall outlet.

FIG. 7A illustrates a lamp 700 plugged into a wall outlet. Lamp 700 can be a stand-alone lighting fixture, such as a table top lamp, a lighting fixture that is embedded into the construction of a building, such as a can light, and the like. The illustrated lamp 700 comprises a power cord 704 that is plugged into a wall outlet in a standard outlet box 706 and electrically connected to standard line voltage wiring 708 within a building wall 710. Lamp 700 does not include memory and cannot store theme information and cannot act upon the theme information to produce theme modes by itself.

Figure 7B:
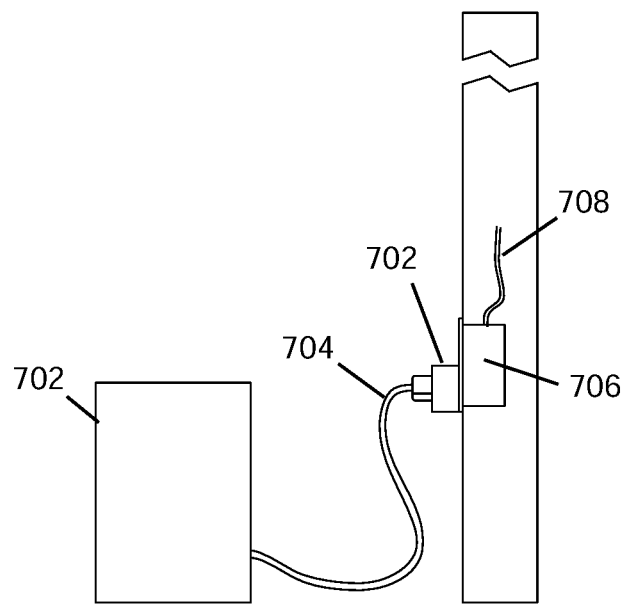
FIG. 7B illustrates a control adapter that includes memory for storing theme information and controls a portable lamp without memory in response to the theme information, according to certain embodiments.

FIG. 7B illustrates a control adapter 702 that includes memory for storing theme information. The control adapter 702 can control the lamp 700 in response to the theme information, according to certain embodiments. Control adapter 702 can be addressable. The control adapter 702 can be plugged into the wall outlet 706 or otherwise in electrical communication with the line voltage wiring 708. The illustrated lamp 700 is plugged into the control adapter 702 or otherwise in electrical communication with the control adapter 702. The control adapter 702 can include circuitry to dim the lamp 700 and memory to store theme information received via the line voltage wiring from the lighting controller 102. The control adapter 702 can control the lamp 700 according to the theme information, such as one or more of ON/OFF timing, color, color temperature, hue, intensity, and the like of the lamp 700, in response to commands and data from the lighting controller 102 sent as the data encoded power waveform over the two-wire path 126.

A control adapter 702 can be installed in can lights or recessed lights in the ceiling. For example, many LED lights have a pig tail wire with a connector that plugs into a mating connector in the can light so the LED lights can be replaced. A control adapter 702 can be configured to plug into the power line coming from the ceiling, then the LED light can plug into another mating connector on the control adaptor 702 so the lighting controller 102 can control each individual can light.

The control adapters 702 can allow the lighting controller 102 to operate standard lights that are readily available in the marketplace.

Lighting Themes

Lighting modules 104, 6100, 6200, 6300, 6400 and control adapter 702 are addressable individually and as part of a group or zone. A group may contain one or more lighting modules and/or control adapters, all of which are treated as single entity from a programming and control point of view. If Group 1 is set to illuminate at a particular time with a particular color (if applicable) and intensity, then at that time, the lighting controller 102 sends a command as part of the data encoded power waveform via the two-wire path 126 to the Group 1 lighting modules and control adapters instructing the Group 1 devices to apply that color and intensity.

Themes are a level of control above groups. A theme is a collection of groups, each group having at least one or more of a uniquely programmable ON/OFF timing, color, color temperature, hue, intensity, and the like. Themes allow lighting designers to create different moods or modes. For instance, an outdoor patio area can have lights of one group above a table, lights of a second group illuminating plants on the peripheral of the seating area, and lights of a third group illuminating a water feature. A designer or a user could then create a "Dining Theme" where the lights above the table can be at full brightness, and lights in the peripheral can be more subdued. The user could also create an "Ambience Theme" by lowering the intensity of the lights above the table, increasing the peripheral and water feature lights, while enabling a color wheel on the water feature. In a similar fashion, themes can be created for seasonal events. For example, the water feature lights can be red, white, and blue for the 4th of July, orange for Halloween, red and green for Christmas, and green for St. Patrick's Day.

In another example, the lights of a home's family room can have a TV theme, where the room lights dim, and a reading theme, where the peripheral lights dim and the light above the easy chair increases in intensity. The home can have a vacation theme, where lights turn ON and OFF and brighten and dim in different areas of the house throughout the evening. The areas of the house that illuminate can change daily.

The advantage of a theme is that once defined, it can be scheduled to turn on automatically, or started manually with great ease. Themes could contain hundreds of groups and groups can include one or more lighting modules. Each lighting module can include multiple lights. A light can be an LED, an incandescent light, a low voltage light, a line voltage light, and the like. Without the concept of themes, each of these groups would have to be individually set up (each time) to create the desired effect.

Implementation of Themes in the Lighting Control System

Themes are obviously advantageous from a lighting designer's or the user's point of view, but add some complexity to the lighting control system. The user can enter the theme information through the operator interface (e.g., interface panel, smart device, or the like) associated with the lighting controller 102. The lighting controller 102 can store the theme information, where the theme information comprises a definition of one or more themes. Each theme can include the addresses of the one or more groups, and one or more of the ON/OFF timing, color, color temperature, hue, and/or intensity of the lights in each of the one or more groups. Then the lighting controller 102 can apply the theme by using the theme information to command the lighting modules 104, 6100, 6200, 6300, 6400 and control adapters 702 to create the desired effect.

Applying Themes Using Sequential Commands

One approach to applying a theme is for the lighting controller 102 to send out individual commands to each group instructing one or more of ON/OFF timing, color, color temperature, hue, and intensity. However, the visual effect while applying the theme sequentially would be less than optimal. One by one, the user would see the individual groups turn ON to their assigned color and intensity as the individual commands were sent. Sometimes, there may be a desire to control each individual light rather than assigning them to a group. In this situation, the user would see the individual lights turn on one by one to their assigned color and intensity as the individual commands were sent.

Applying Themes Using Queued Commands

The visual downside of the sequential command approach can be mitigated by using queued commands. Before sending ON commands to the groups, the lighting controller 102 can send queued commands. A queued command tells a lighting fixture or control adapter to prepare to go to a specific color and intensity, but not to apply the color and intensity until instructed by an "apply-queued" command. This allows the lighting controller 102 to program all of the groups using the queued command, then send out a single apply-queued command that the lighting modules and control adapters apply or act upon in unison. The visual effect is now one of all the fixtures coming on at the same time or at approximately the same time with the colors and intensities as defined in the theme. The queued command approach may be visually superior to the sequential command approach.

Sequential and Queued Command Approaches

In some embodiments, the queued approach may be visually superior to the sequential approach. However, both can have a common detriment. As mentioned above, themes may contain hundreds of groups. Depending on the number of groups, it can take a considerable amount of time to apply a theme due to the number of commands that are sent as part of the data encoded power waveform. The user can apply the theme from the lighting controller's operator interface or from a smartphone application and see nothing happen. Thinking the command was not received by the lighting modules and control adapters, the user may attempt to apply the command again. This generates a second set of commands sent over the two-wire path 126, further increasing the data traffic. The user may understand what is happening, but the response of the lighting system 100 can appear very sluggish and result in a poor user experience.

Instant Theme Features

An aspect to applying themes instantly or approximately instantly can be to limit the number of commands sent to the lighting modules and/or control adapters when the lighting modules and/or control adapters apply the ON/OFF timing, color, color temperature, hue, and/or intensity associated with the theme. This can be accomplished by storing the definition of each theme meant for each group in the lighting modules and control adapters before the lighting modules and/or control adapters apply the ON/OFF timing, color, color temperature, hue, and/or intensity associated with the theme. The lighting module circuitry shown in FIGS. 3-6 includes a microcontroller. In some aspects the microcontroller can include non-volatile memory such as, but not limited to, EEPROM memory, re-writeable FLASH memory, both, and the like. The memory can be used to store the ON/OFF timing, color, color temperature, hue and/or intensity settings for multiple themes of each of the groups associated with the lighting module and/or control adapter. In another aspect, the lighting module circuitry and the control adapter circuitry can include an external non-volatile memory chip in communication with the microcontroller to store the theme information. Each lighting module and control adapter can be taught the information associated with each theme for a particular group.

In an embodiment, the lighting controller 102 transmits a data encoded power signal or waveform over a two-wire network. The data encoded power signal can include an encoded message. The encoded message can include commands associated with lighting themes. The commands associated with the lighting themes can be based on user input entered by a user at the lighting controller 102.

The encoded message can include a first portion that includes a command comprising an indication of a lighting theme of a plurality of lighting themes. The first portion of the message can further include a qualifier that provides information or instructions associated with the indicated lighting theme. The qualifier and the indication of the lighting theme may be part of the same command. In other aspects, the qualifier and the indication of the lighting theme are not included in the same command. Examples of the information or instructions of the qualifier can be apply or turn ON the indicated lighting theme, turn OFF the indicated lighting theme, end of message or apply END to indicate that the sequence of commands in the message is complete, a notification that the theme settings for the identified theme have changed, and the like.

The encoded message can include a second portion that comprises one or more commands that can include settings or other information that the lighting modules apply to create the indicated theme. The settings or other information can include one or more of ON/OFF timing, color settings, color temperature, hue, intensity settings, and the like for the indicated lighting theme that the lighting modules apply to the one or more lamps of the lighting module.

The data encoded power signal can further include one or more lighting module addresses or one or more group addresses for groups of lighting modules.

The lighting modules can receive the data encoded power signal from the lighting controller 102 via the two-wire network and can decode at least the addresses. An addressed lighting module can further decode at least a portion of the encoded message.

In one aspect, the addressed lighting module can determine the indicated theme from the first portion of the message and store the settings from the second portion of the message.

In another aspect, the addressed lighting module can determine the indicated theme from a first portion of the message, determine the instructions from the first portion of the message, retrieve from memory the stored settings associated with the indicated theme and apply the retrieved settings to one or more lamps within the lighting module. The memory including the stored settings can be non-volatile memory. After applying the stored settings to the one or more lamps, the lighting module can compare the stored settings with the settings of the second portion of the message to determine whether the indicated theme has changed. The lighting controller can save the settings of the second portion of the message in RAM or other temporary storage prior to comparing. When the indicated theme has changed, the lighting module can apply the new settings from the commands in the second portion of the message to the one or more lamps and over-write in the memory (e.g., non-volatile memory) the stored settings with the new settings.

If there are no settings for the indicated theme stored in the memory, the lighting module can apply the new settings from the commands in the second portion of the message and store the new settings in the memory.

In another aspect, the addressed lighting module can determine the indicated theme from a first portion of the message and determine the instructions from the first portion of the message, where the instructions include an indication that one or more settings associated with the indicated theme have changed. When the settings associated with the indicated theme have changed, the lighting module can apply the new settings from the commands in the second portion of the message to the one or more lamps and over-write in the memory (e.g., non-volatile memory) stored setting with the new settings without comparing.

Instant Theme Command Examples

The following command and payloads comprise non-limiting examples of commands and payloads that can be used to implement the instant theme features in the lighting modules and control adapters. In other embodiments, different commands and payloads can be used to implement the instant theme features.

"Teach Theme" Command Example (1 Byte Payload)

This command can used to store information in the light fixture's memory. T5 . . . T0 comprise examples of the binary representation of the Theme Index. For example, allowable values can be 0 to 51 when there is sufficient memory in the light fixtures to store 51 themes. In other embodiments, there can be more or less than 51 themes. Examples: 0=Theme A, 1=Theme B, etc.

Payload Example:

| MSB | | | | | | | LSB |
|---|---|---|---|---|---|---|---|
| 0 | 0 | T5 | T4 | T3 | T2 | T1 | T0 |

"Apply Theme" Command Example (1 Byte Payload)

This command can be used to turn ON/OFF a theme that is stored in the lighting fixture's memory, and can also convey that the theme has changed in the controller. Q1 and Q0 represent examples of binary qualifiers. In other embodiments there can be more than or less than two binary qualifiers associated with the command. T5 . . . T0 comprise examples of the binary representation of the Theme Index. For example, allowable values can be 0 to 51 when there is sufficient memory in the light fixtures to store 51 themes. In other embodiments, there can be more or less than 51 themes. Examples: 0=Theme A, 1=Theme B, etc.

Payload Example:

| MSB | | | | | | | LSB |
|---|---|---|---|---|---|---|---|
| Q1 | Q0 | T5 | T4 | T3 | T2 | T1 | T0 |

| Q1 | Q0 | Meaning |
|---|---|---|
| 0 | 0 | Apply END—this case indicates the completion of a series of commands that started with an ON or LEARN or TEACH command. For example, the Apply END qualifier indicates to the lighting fixture that the sequence of commands is complete. In one embodiment, T5 . . . T0 can be set to 000000. |
| 0 | 1 | Theme ON—the theme identified in T5 . . . T0 is being turned ON. |
| 1 | 0 | Theme OFF—the theme identified in T5 . . . T0 is being turned OFF. |
| 1 | 1 | Theme LEARN—indicates that the information following the command (for the theme identified in T5 . . . T0) has changed since it was last sent and should not be acted upon immediately, because the values stored in the lighting fixture may be different from the message that follows the Apply Theme Command. |

"Queue White Intensity" Command Example (1 Byte Payload)

This command can be used with non-color lighting fixtures and instructs the lighting fixture to prepare to apply an intensity setting once the "Apply END" command is received. W7 . . . W0 comprise examples of the binary representation of the intensity setting of the white LED. In an embodiment, allowable values can be 0-100.

Payload Example

| MSB | | | | | | | LSB |
|---|---|---|---|---|---|---|---|
| W7 | W6 | W5 | W4 | W3 | W2 | W1 | W0 |

"Queue RGBW Intensity" Command (4 Byte Payload)

This command can be typically used with color fixtures and instructs the fixture to prepare to apply the intensity settings once the "Apply END" command is received.

Payload Byte 0 Example

| MSB | | | | | | | LSB |
|---|---|---|---|---|---|---|---|
| W7 | W6 | W5 | W4 | W3 | W2 | W1 | W0 |

W7 . . . W0 comprise examples of the binary representation of the intensity setting of the white LED. In an embodiment, allowable values can be 0-100.

Payload Byte 1 Example

| MSB | | | | | | | LSB |
|---|---|---|---|---|---|---|---|
| R7 | R6 | R5 | R4 | R3 | R2 | R1 | R0 |

R7 . . . R0 comprise examples of the binary representation of the intensity setting of the red LED. In an embodiment, allowable values can be 0-100.

Payload Byte 2 Example

| MSB | | | | | | | LSB |
|---|---|---|---|---|---|---|---|
| G7 | G6 | G5 | G4 | G3 | G2 | G1 | G0 |

G7 . . . G0 comprise examples of the binary representation of the intensity setting of the green LED. In an embodiment, allowable values can be 0-100.

Payload Byte 3 Example

| MSB | | | | | | | LSB |
|---|---|---|---|---|---|---|---|
| B7 | B6 | B5 | B4 | B3 | B2 | B1 | B0 |

B7 . . . B0 comprise examples of the binary representation of the intensity setting of the blue LED. In an embodiment, allowable values can be 0-100.

Teach Approach

In one embodiment, a "Teach-Theme" command can be used to transfer the meaning of a theme to each group of one or more lighting modules and/or control adapters. This command can target a particular group and include one or more of ON/OFF timing, color, color temperature, hue, intensity, and a theme designator (number). After receiving the teach-theme command, the lighting module and control adapter can store the information associated with the teach-theme command in non-volatile memory. After each lighting module and control adapter of each group is taught the meaning of each theme that the group is included in, the teaching process can be complete.

After the lighting modules and control adapters are taught their group's settings for each theme, the lighting controller 102 can send a global "apply theme X" command, where X can be the theme number or designator, to the lighting modules and control adapters in the data encoded power waveform via the two-wire path 126. Upon receiving the apply theme X command, the lighting modules and control adapters can retrieve the settings associated with theme X from their non-volatile memory and instantly apply the ON/OFF timing, color, color temperature, hue, and intensity associated with theme X. The end result is that a theme can be applied across the entire lighting system 100 with a single command. There are a few different approaches that can be used to teach the themes.

The lighting controller 102 can automatically detect when a user modifies the settings in a theme, and automatically teach the new settings to the appropriate groups. The approach can cause the lighting controller 102 to apply power to the two-wire path 126 each time the user modifies a theme. This may prove troublesome since another worker may still be installing lights, and not expecting the lighting system 100 to be powered.

In another embodiment, the operator interface can include a "teach theme" function, which the user can activate in order to teach the themes to the lighting modules and control adapters.

The lighting controller 102 can be programmed to teach themes at a predetermined time, such as midnight, every day.

Example Command Sequences

Once the user has programmed a theme into the lighting controller 102, the user can instruct the lighting controller 102 to teach the programmed theme to the lighting modules so that at a later time, the lighting modules can instantly or approximately instantly apply the theme.

Teach Approach Example Commands

Once the user has programmed a theme into the lighting controller 102, the user can instruct the lighting controller 102 to teach the programmed theme to the lighting modules so that at a later time, the lighting modules can instantly or approximately instantly apply the theme. Examples of command sequences sent by the lighting controller 102 to the lighting modules to teach a theme to the lighting modules are illustrated below.

Example of Non-Color Command Sequence

| Command | Payload(s) | Result |
|---|---|---|
| Teach Theme | Byte1 - 00000010 (Theme "B") | Lighting modules receive this command and program the information following the command into memory in the "Theme B" non-volatile memory slot. |
| Queue White Intensity | Byte1 - 00001111 (Int = 15%) | Lighting modules store the payload value (15% intensity in this example) into RAM. |
| Apply Theme (Apply End Variant) | Byte1 - 00000000 | Lighting modules copy the intensity value from RAM to Theme B non-volatile memory slot. |
| At a later time | | |
| Apply Theme (Theme ON Variant) | Byte1 - 01000010 (Theme "B" ON) | Lighting modules receive the "01" in bits 7 and 6 and "000010" in bits 5-0 and decode as a Theme B ON. Lighting modules then retrieve the Theme B setting from non-volatile memory and apply the retrieved intensity to the LED(s). |

Example of Color Command Sequence

| Command | Payload(s) | Result |
|---|---|---|
| Teach Theme | Byte1 - 00000010 (Theme "B") | Lighting modules receive this command and program the information following the command into memory in the "Theme B" non-volatile memory slot. |
| Queue RGBW Intensity | Byte1 - 00001111 (white Int = 15%) Byte2 - 00000000 (red Int = 0%) Byte3 - 00100000 (green Int = 32%) Byte4 - 00101000 (blue Int = 40%) | Lighting modules store the payload values into RAM. |
| Apply Theme (Apply End Variant) | Byte1 - 00000000 | Lighting modules copy intensity values from RAM to the appropriate Theme B non-volatile memory slot. |
| At a later time | | |
| Apply Theme (Theme ON Variant) | Byte1 - 01000010 (Theme "B" ON) | Lighting modules receive the "01" in bits 7 and 6 and "000010" in bits 5-0 decode as a Theme B ON. Lighting modules then |

| Command | Payload(s) | Result |
|---------|-----------|--------|
| | | retrieve the Theme B settings from non-volatile memory and apply the retrieved intensities to the LEDs. |

Figure 8A:
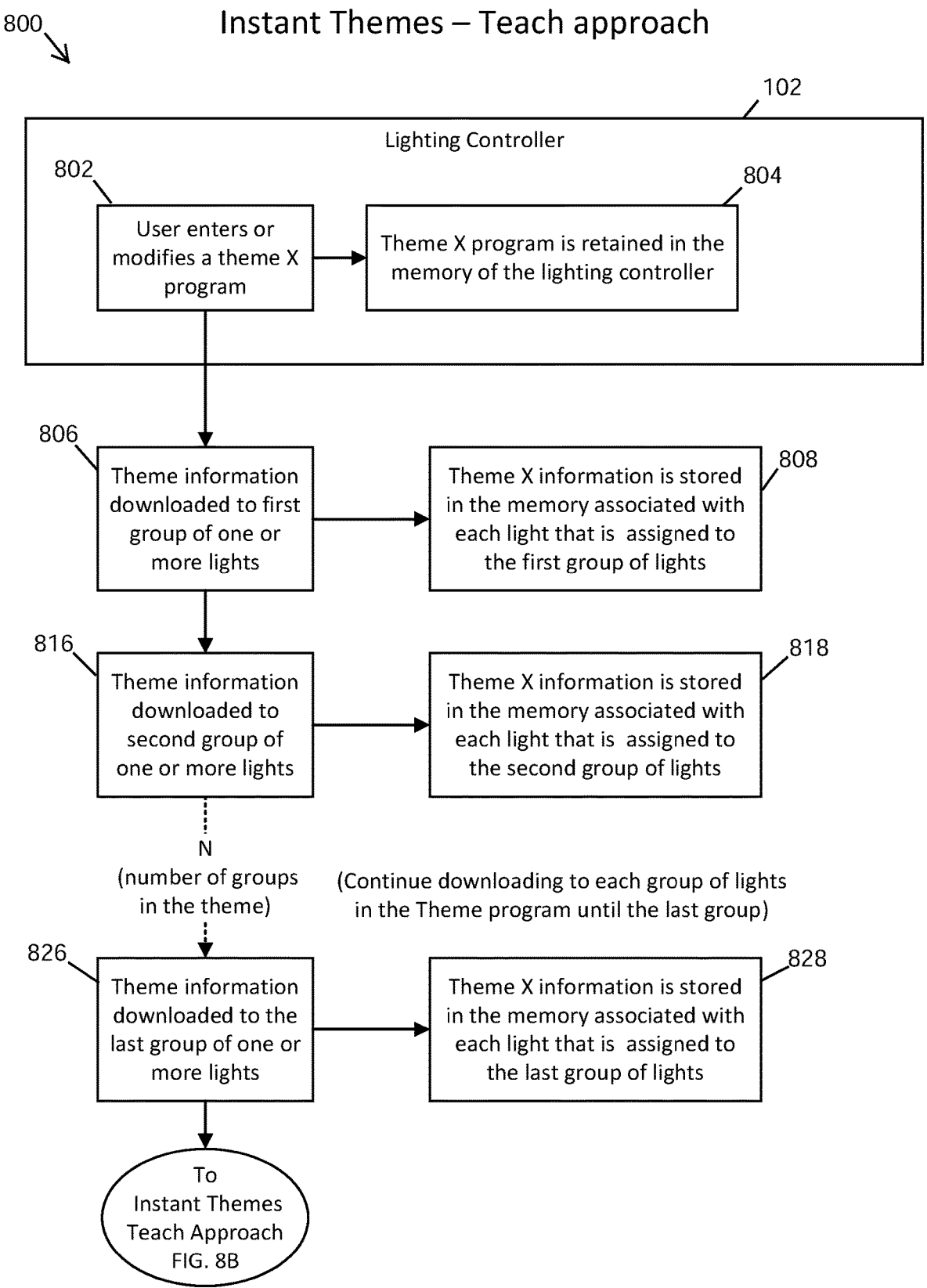
FIGS. 8A-8C are flow charts illustrating a process to apply lighting themes to one or more groups of lighting modules, according to certain embodiments.
Figure 8B:
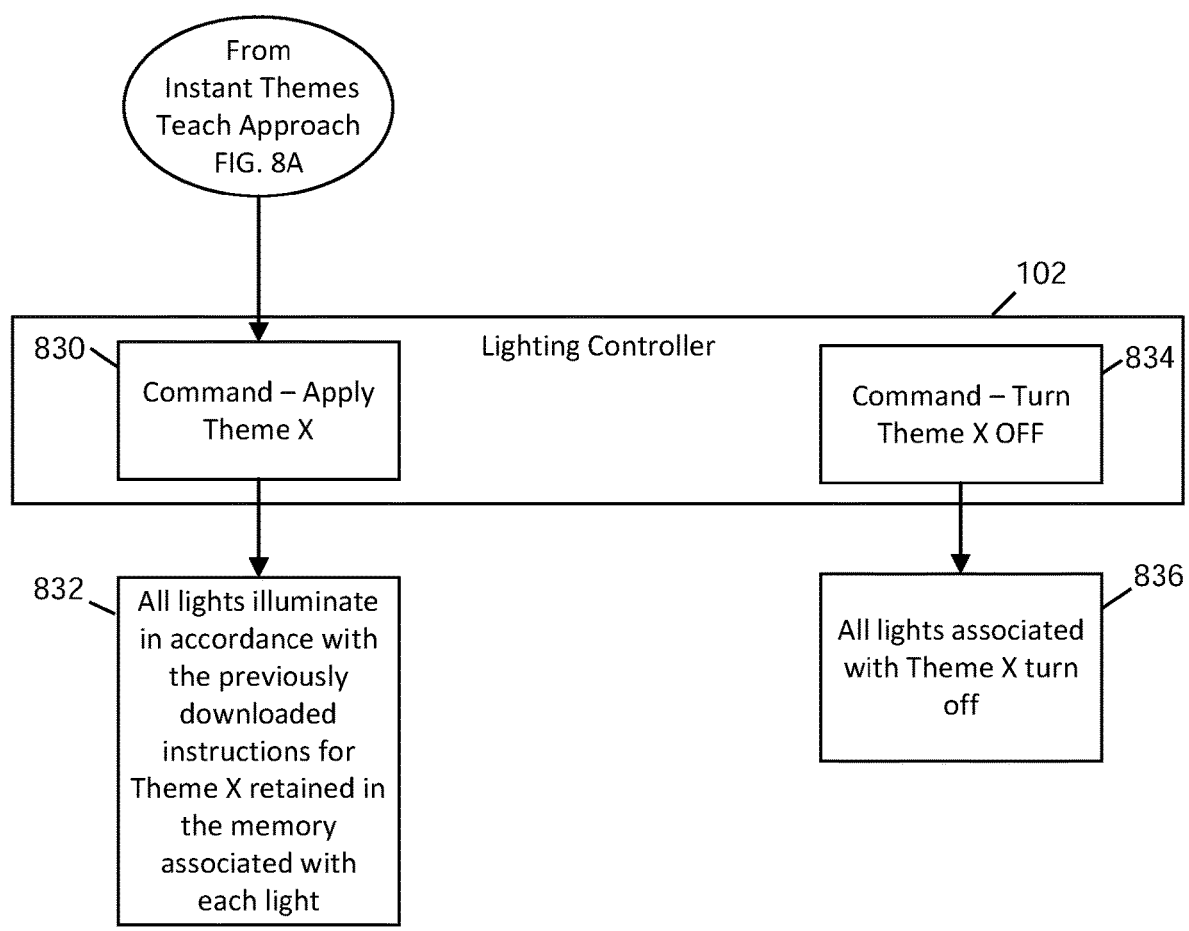
Figure 8C:
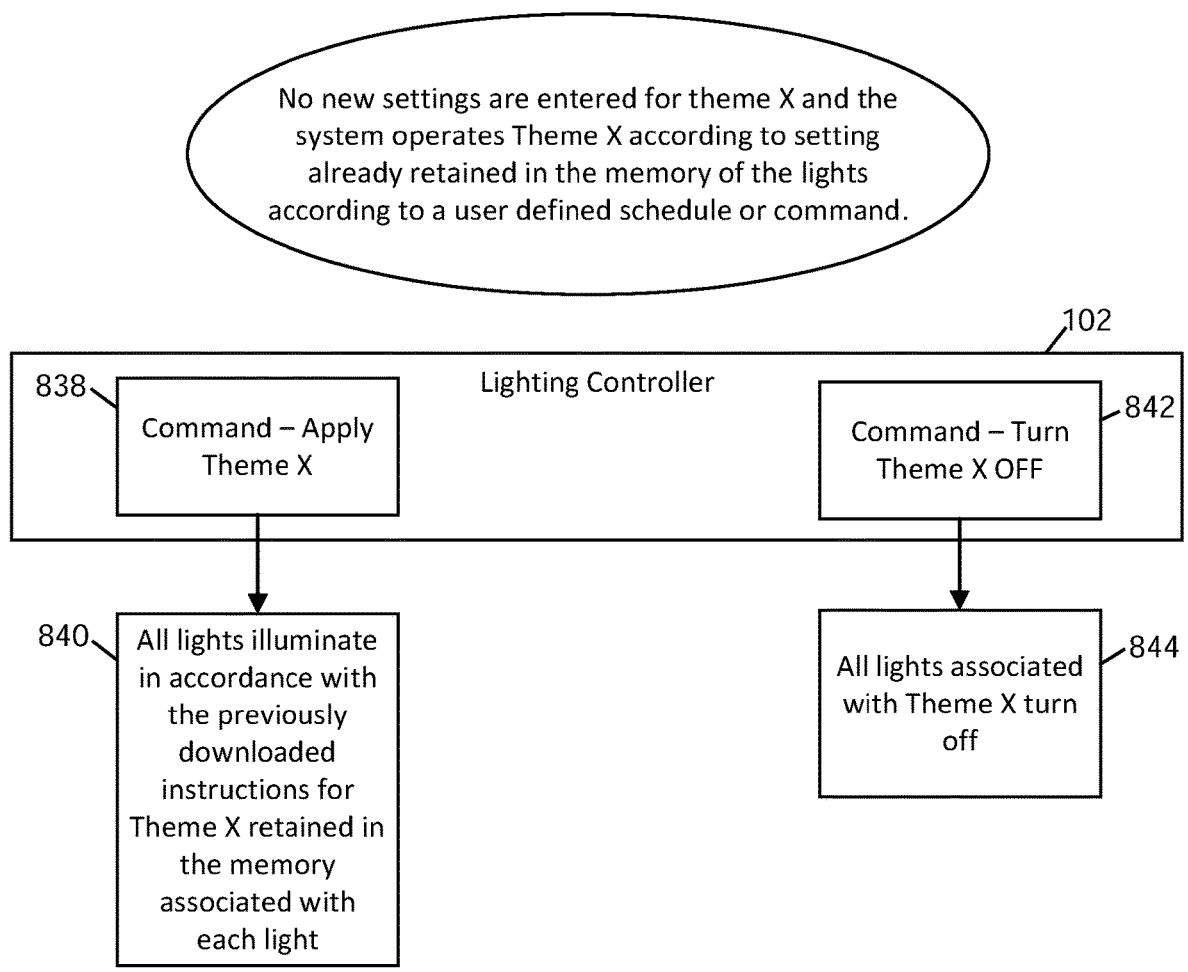
Figure 9A:
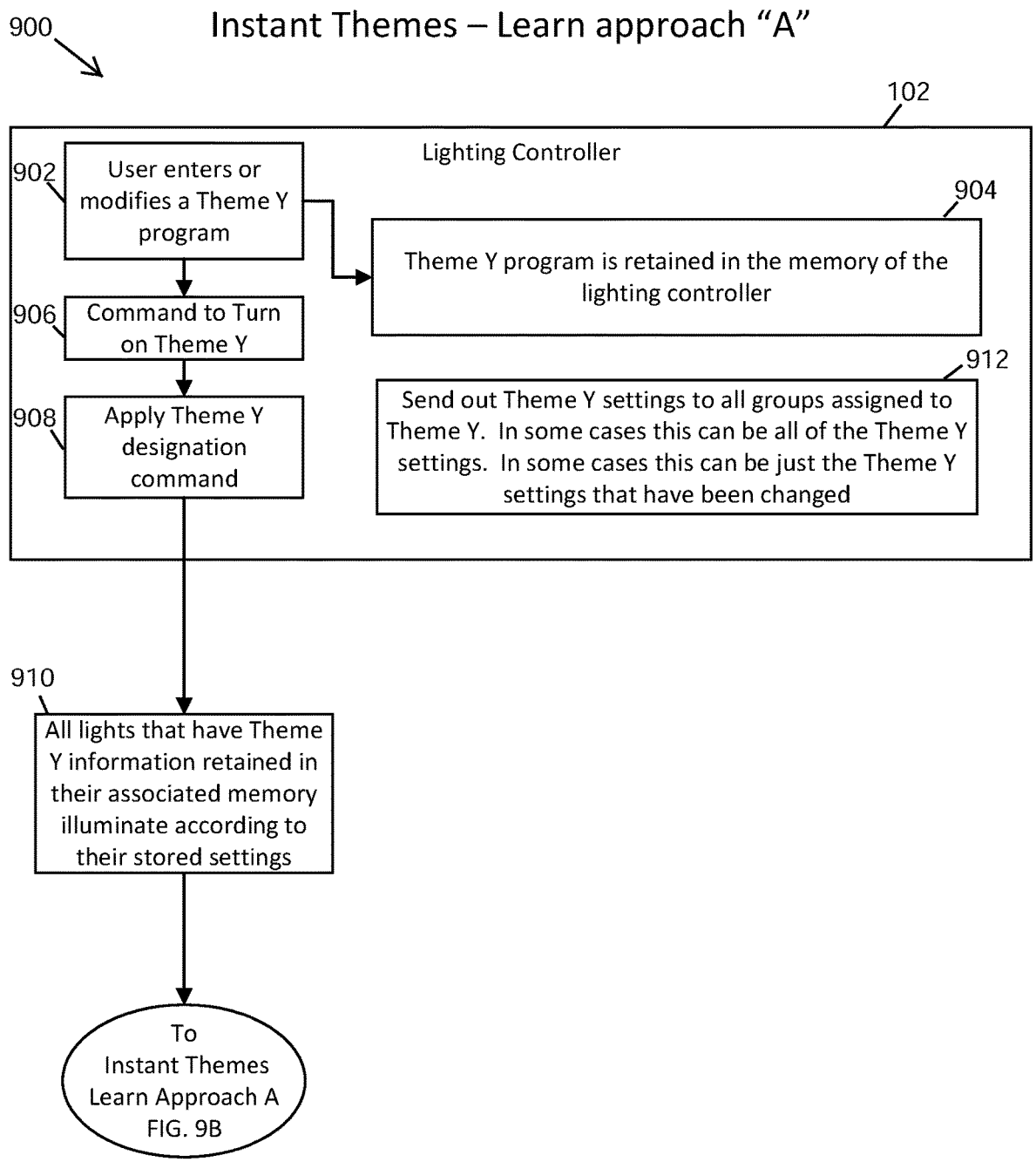
FIGS. 9A-9E are flow charts illustrating another process to apply lighting themes to one or more groups of lighting modules, according to certain embodiments.
Figure 9B:
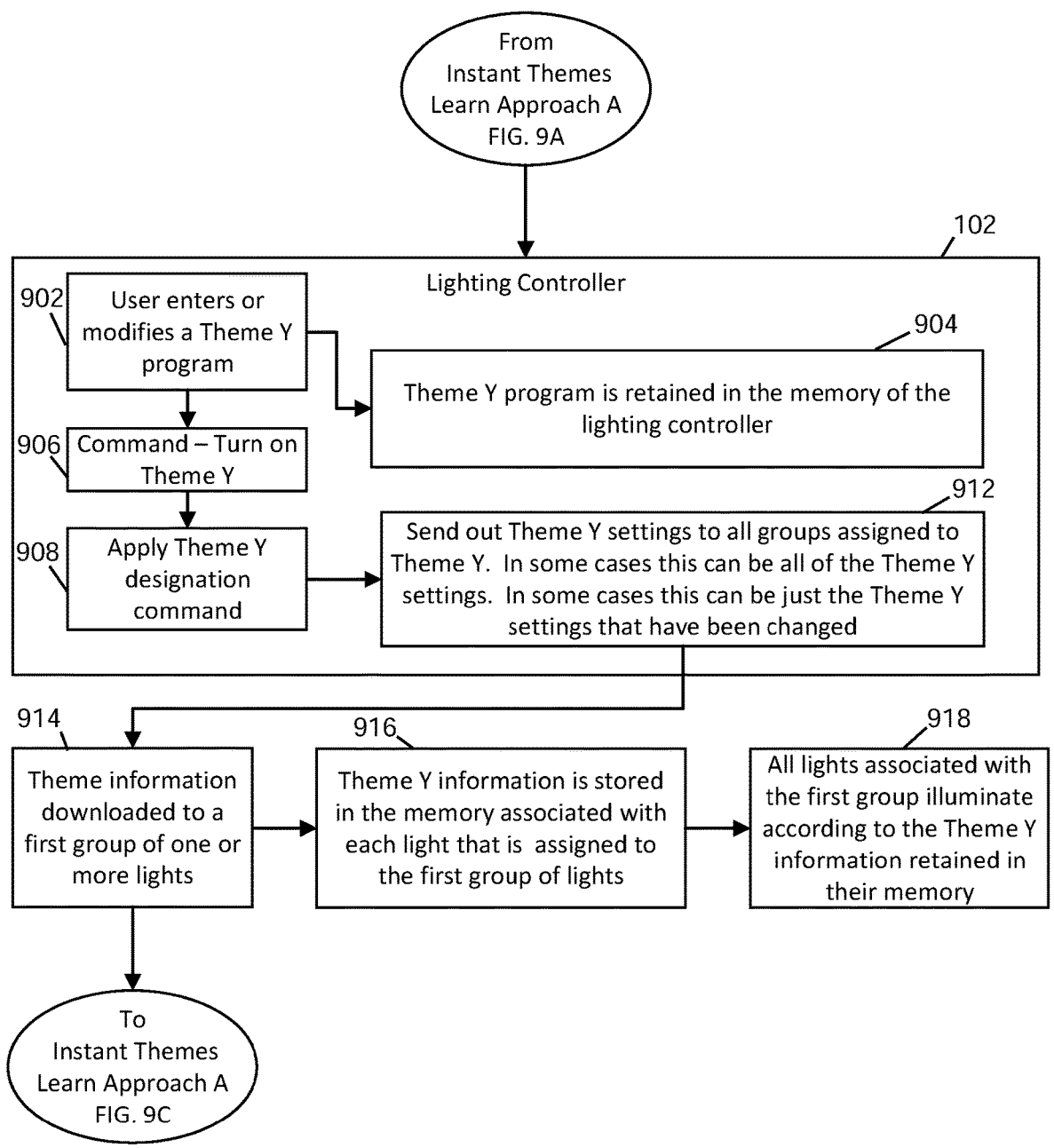
Figure 9C:
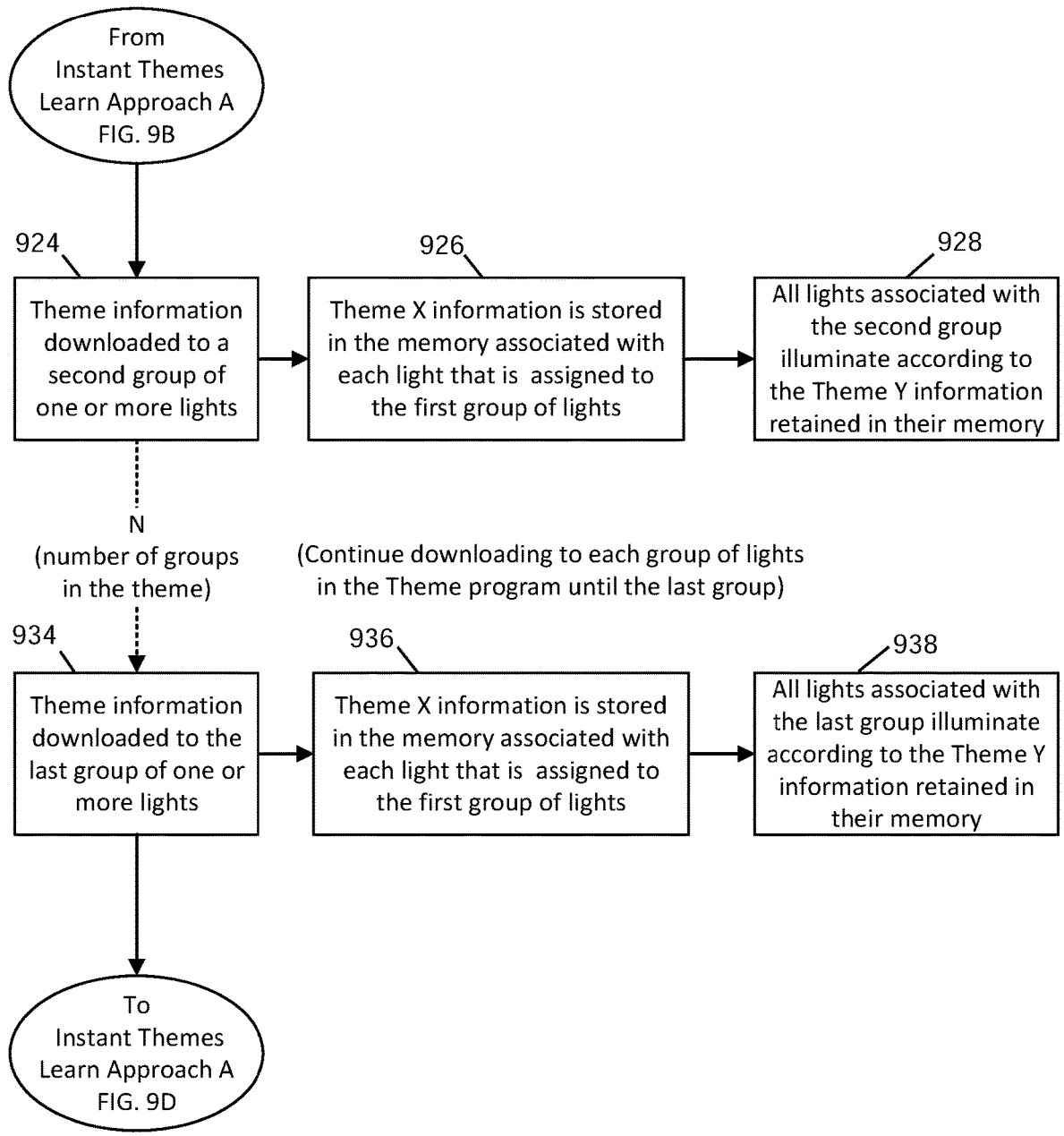
Figure 9D:
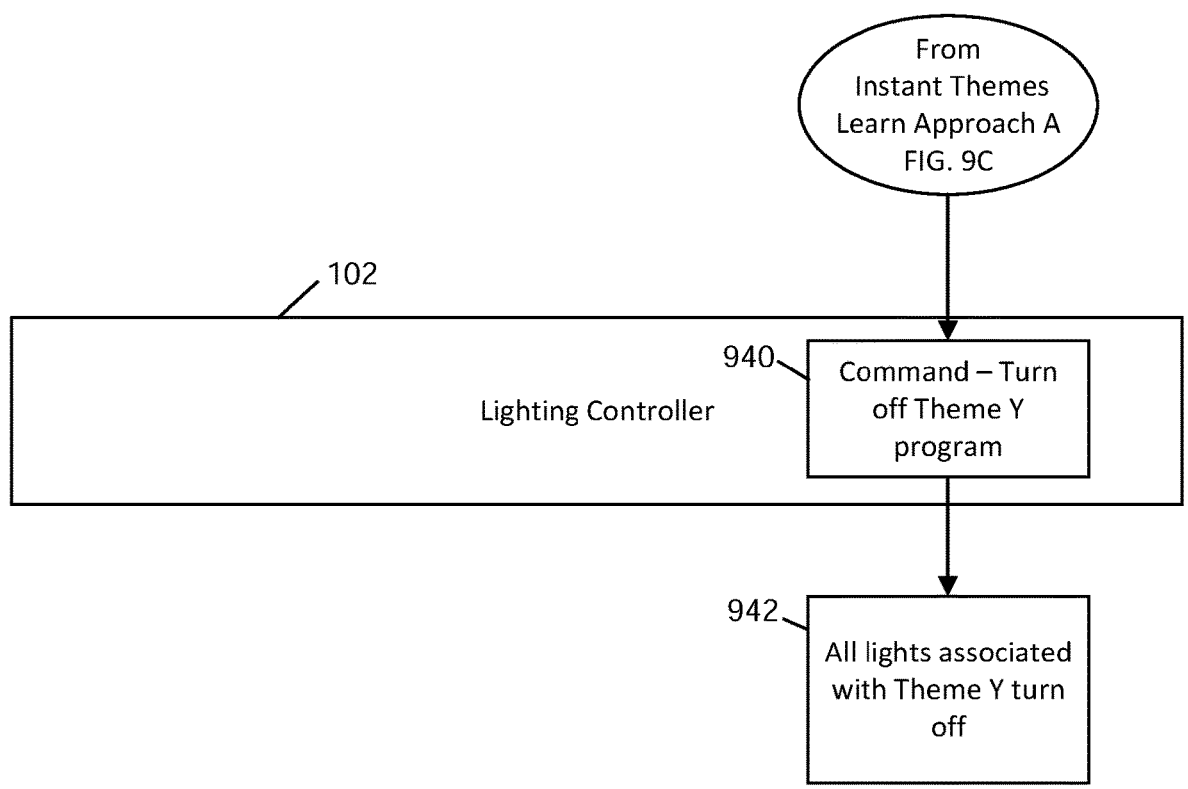
Figure 9E:
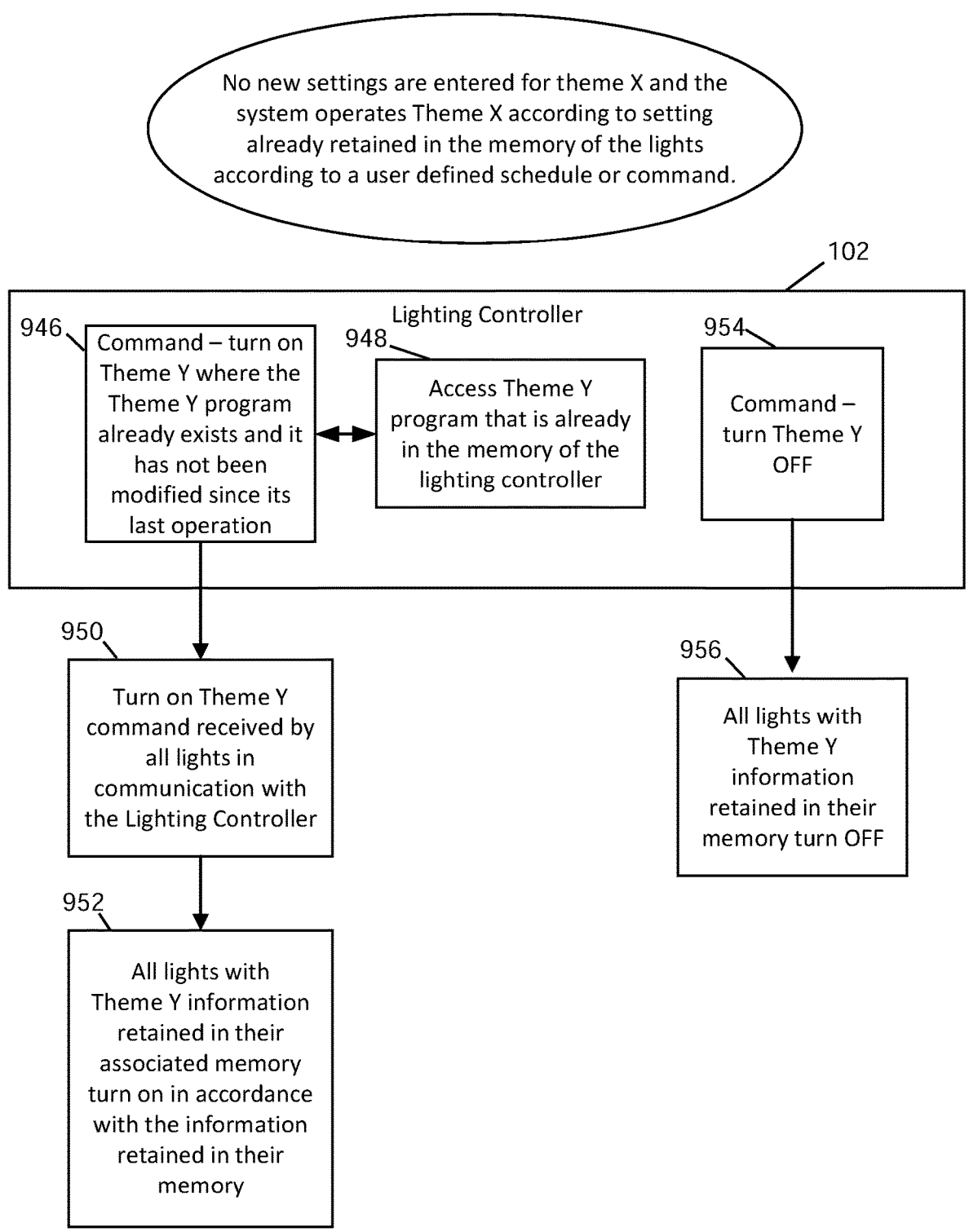
Figure 10A:
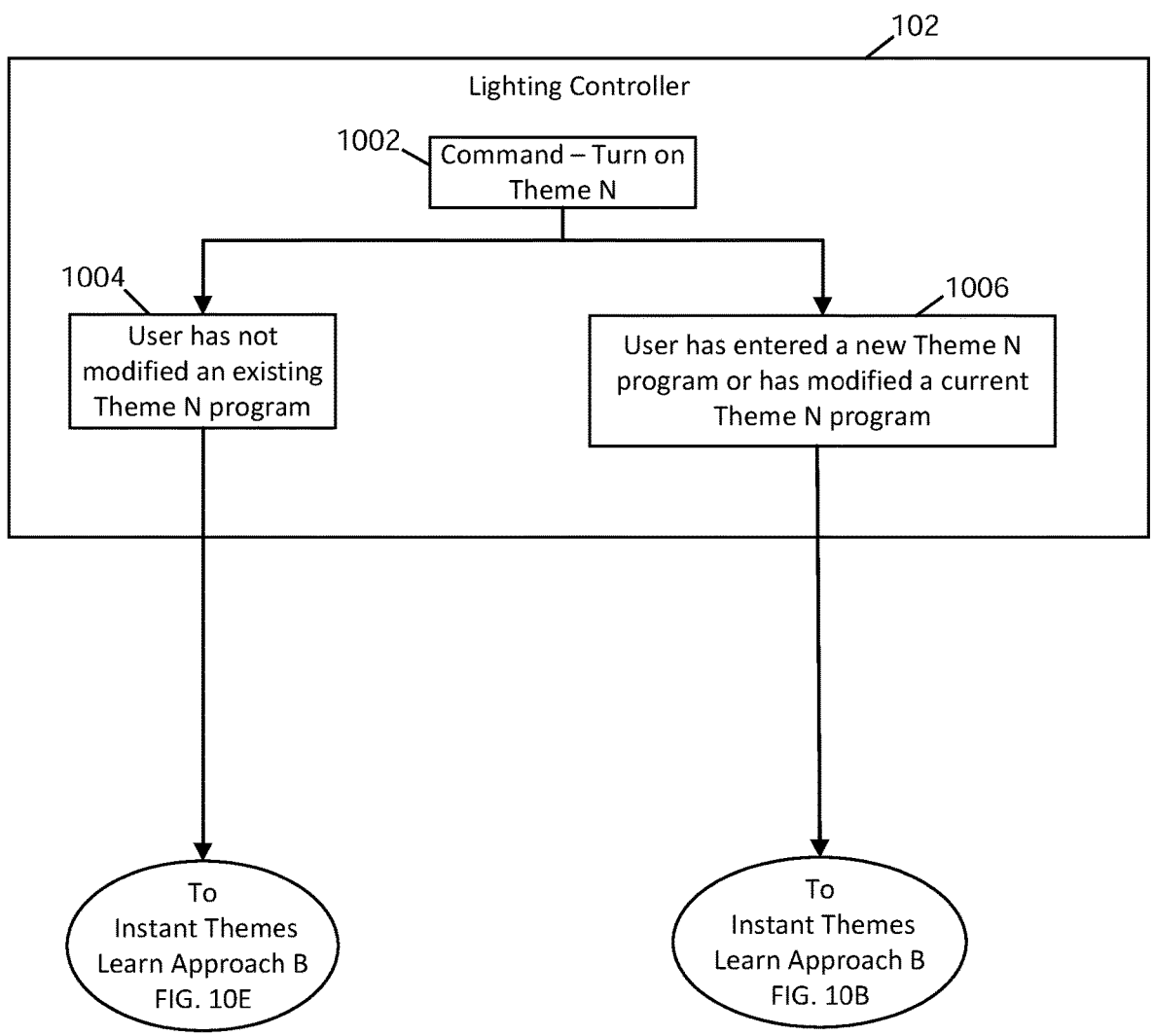
FIGS. 10A-10E are flow charts illustrating another process to apply lighting themes to one or more groups of lighting modules, according to certain embodiments.
Figure 10B:
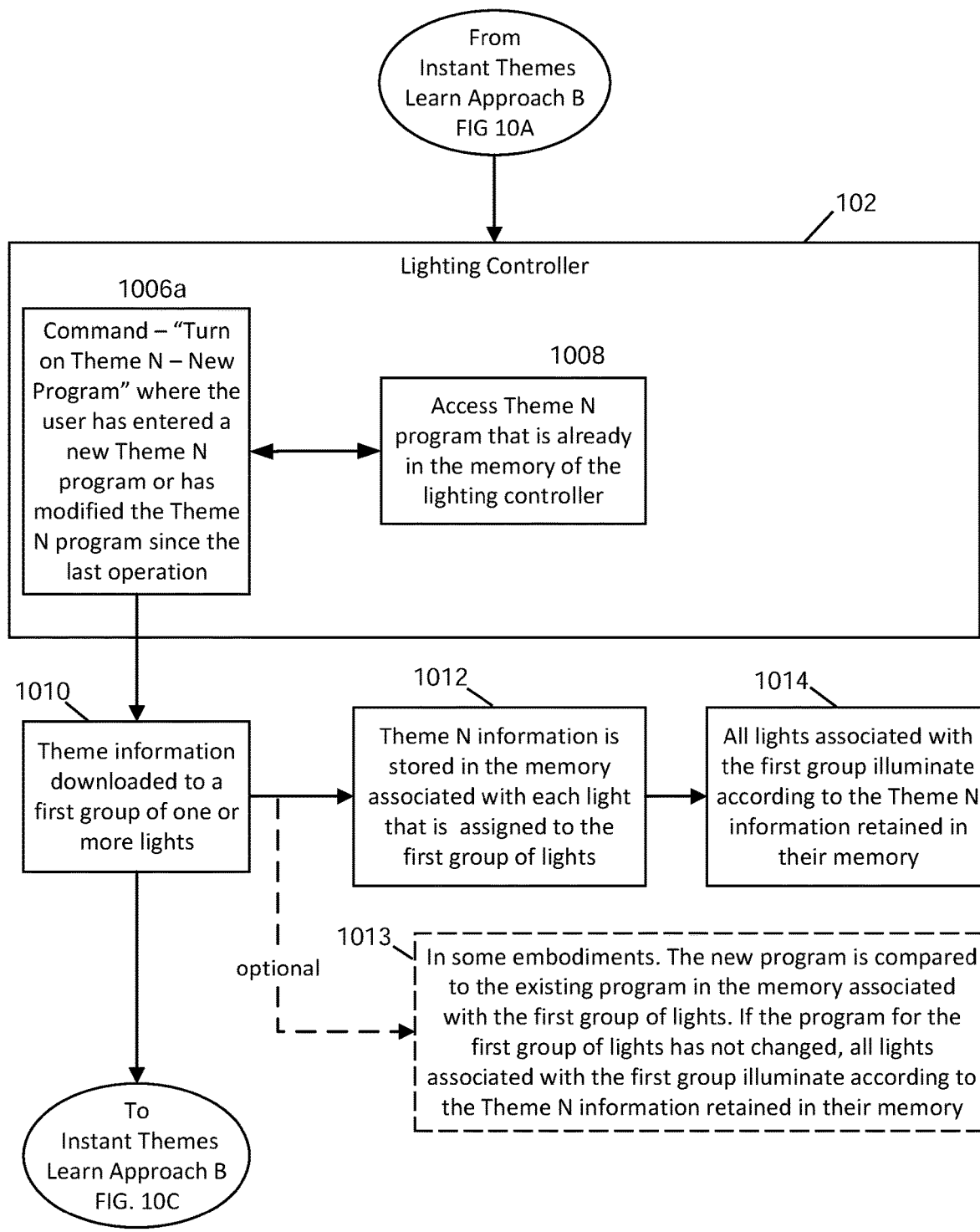
Figure 10C:
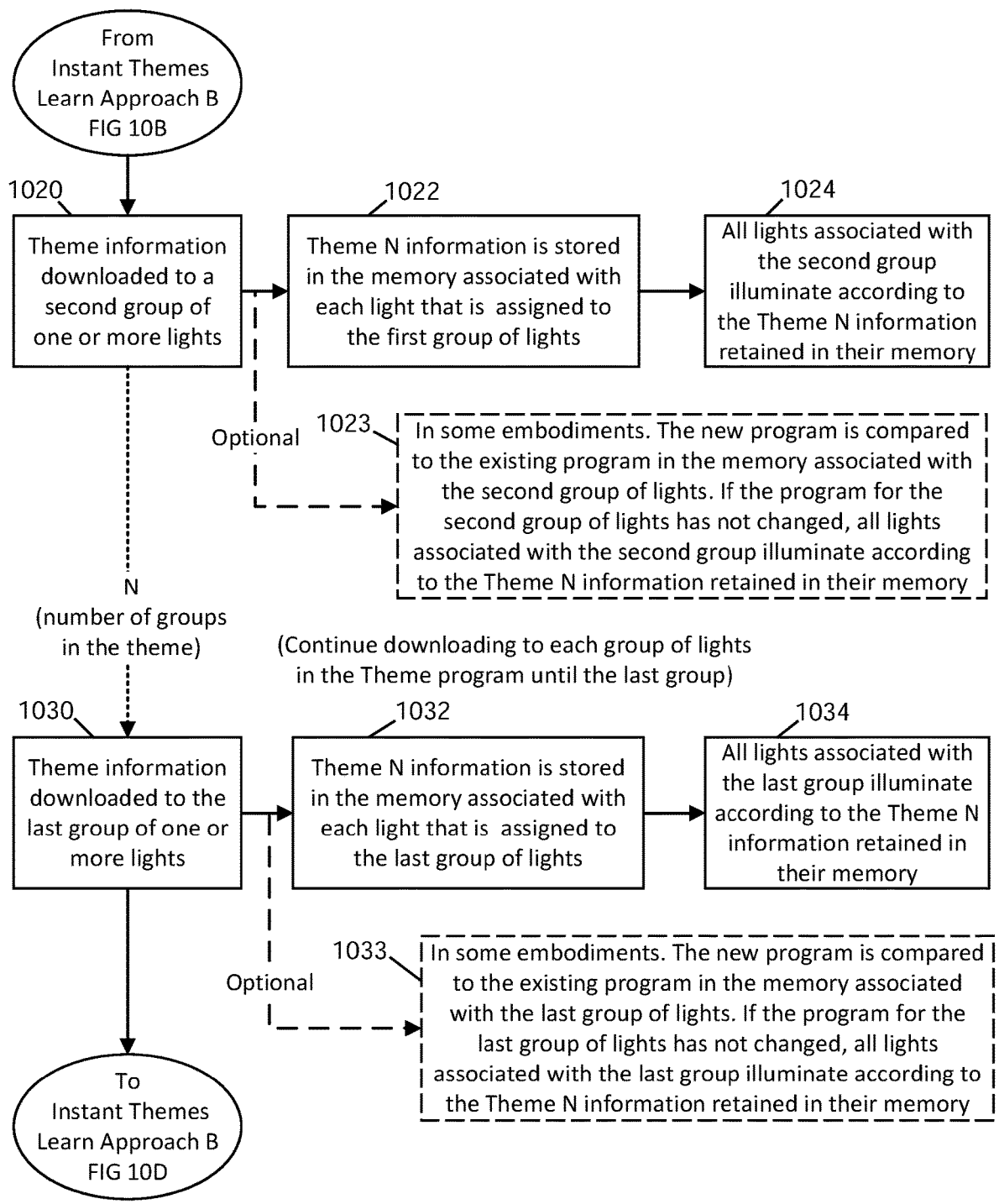
Figure 10D:
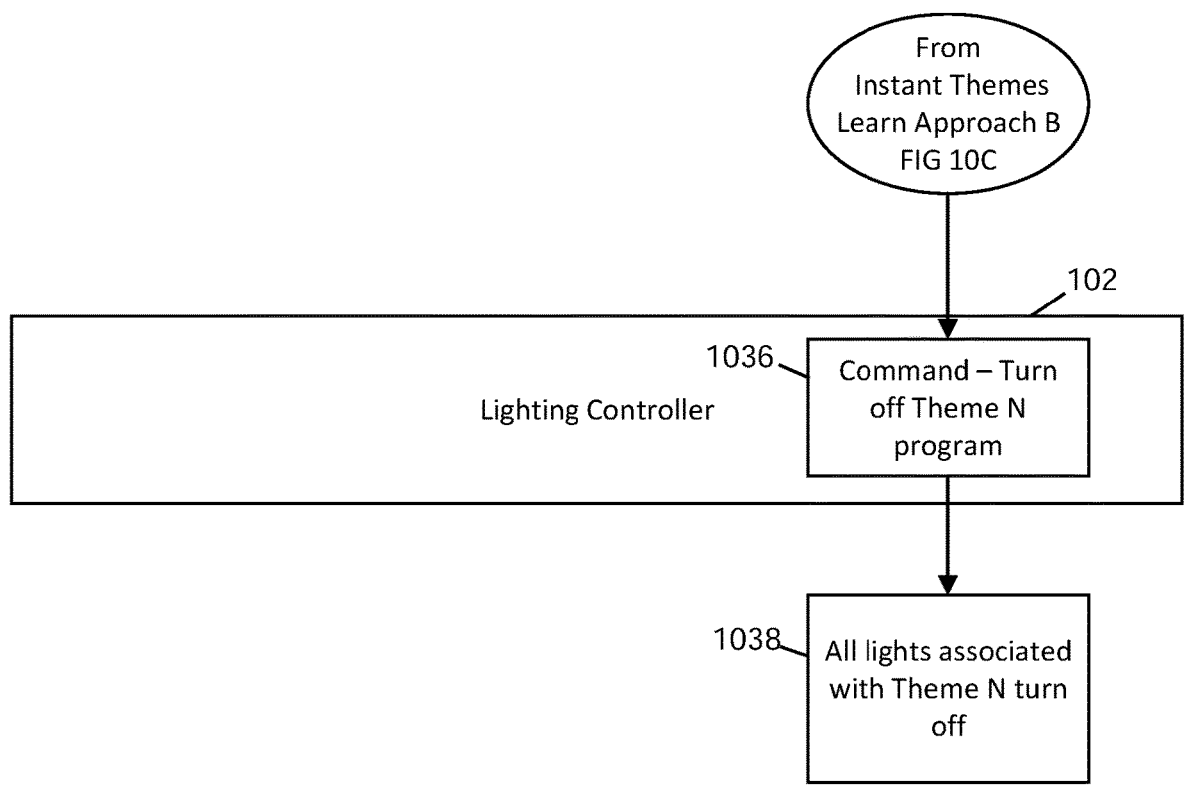
Figure 10E:
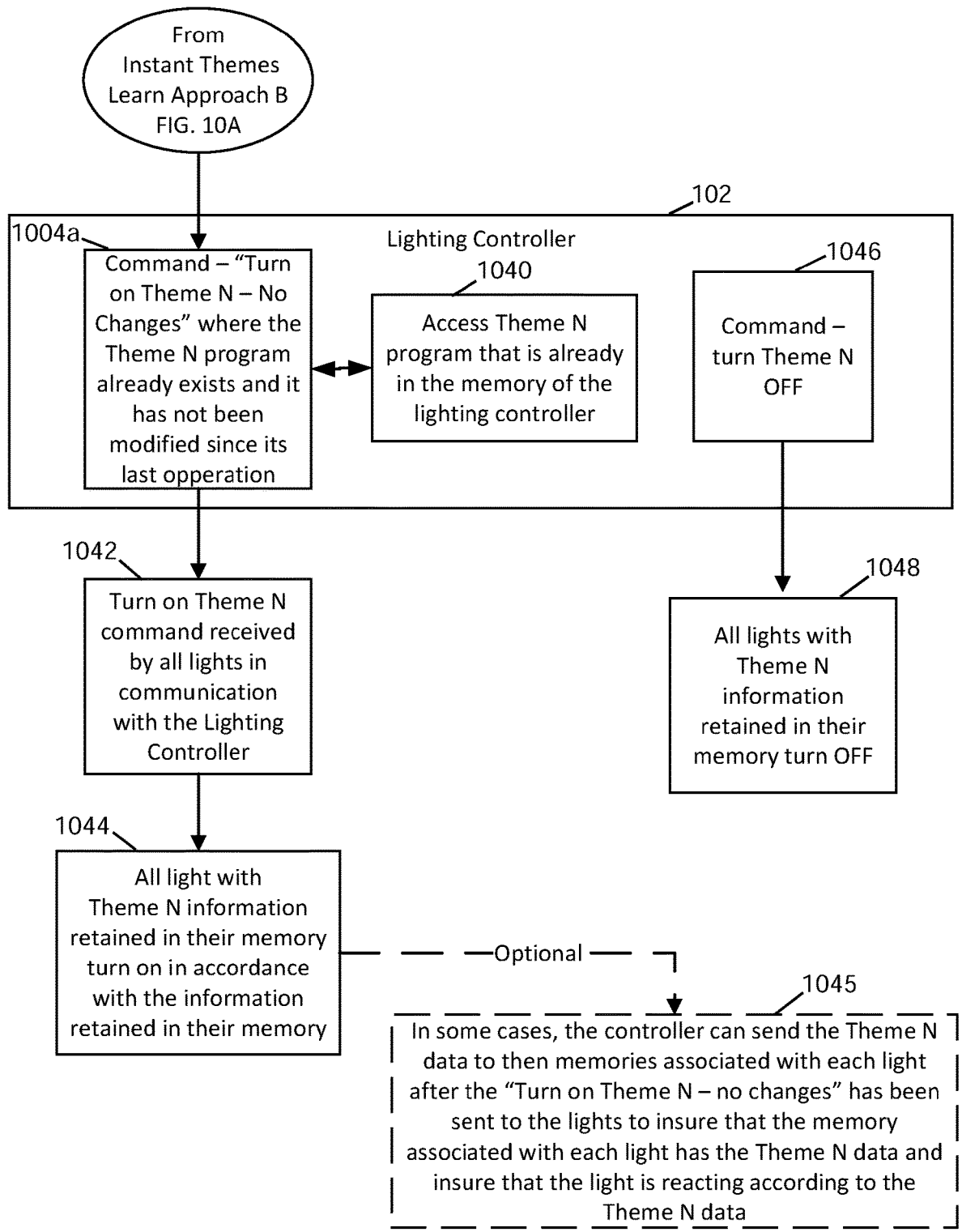

FIGS. 8A-8C are flow charts illustrating a teach process 800 to apply a lighting theme to a collection of groups of lighting modules and control adapters, according to certain embodiments.

At block 802, the user enters or modifies the theme X program and at block 804, the lighting controller 102 can store the theme X information in its memory.

At block 806, the first group of one or more lighting modules and/or control adapters can download the theme X information. For example, the first group of the one or more lighting modules and/or control adapters can receive and decode the theme X information from the data encoded power waveform sent over the two-wire path 126 by the lighting controller 102. At block 808, the first group of the one or more lighting modules and/or control adapters can store the theme X information in their memory.

At block 816, the second group of one or more lighting modules and/or control adapters can download the theme X information. For example, the second group of the one or more lighting modules and/or control adapters can receive and decode the theme X information from the data encoded power waveform sent over the two-wire path 126 by the lighting controller 102. At block 818, the second group of the one or more lighting modules and/or control adapters can store the theme X information in their memory.

These steps are repeated for each group associated or identified in the theme X information, until at block 826, the last group of one or more lighting modules and/or control adapters can download the theme X information. For example, the last group of the one or more lighting modules and/or control adapters can receive and decode the theme X information from the data encoded power waveform sent over the two-wire path 126 by the lighting controller 102. At block 828, the last group of the one or more lighting modules and/or control adapters can store the theme X information in their memory.

At block 830, the lighting controller 102 can send the apply theme X command over the two-wire path 126 to the one or more lighting modules and control adapters of the lighting system 100. At block 832, the one or more lighting modules and/or control adapters can receive and decode the apply theme X command from the data encoded power waveform sent over the two-wire path 126 by the lighting controller 102. The one or more lighting modules and the control adapters can retrieve the theme X information stored in their memory, and the one or more lighting modules can illuminate and the one or more control adapters can cause their associated lamps 700 to illuminate in accordance with the previously downloaded instructions for theme X that are stored in the memory of each of the one or more lighting modules and control adapters that are associated with the theme X program.

At block 834, the lighting controller 102 can send the turn theme X OFF command over the two-wire path 126 to the one or more lighting modules and control adapters of the lighting system 100. At block 836, the one or more lighting modules and/or control adapters can receive and decode the turn theme X OFF command from the data encoded power waveform sent over the two-wire path 126 by the lighting controller 102. The one or more lighting modules and the lamps 700 of the one or more control adapters associated with theme X turn off.

Blocks 838-844 illustrate the teach approach when no new settings are entered for theme X. The lighting system 100 can operate theme X according to the settings stored in the memory of the one or more lighting modules and control adapters and in response to a user defined schedule or command.

At block 838, the lighting controller 102 can send the apply theme X command over the two-wire path 126 to the one or more lighting modules and control adapters of the lighting system 100. At block 840, the one or more lighting modules and/or control adapters can receive and decode the apply theme X command from the data encoded power waveform sent over the two-wire path 126 by the lighting controller 102. The one or more lighting modules and the control adapters can retrieve the theme X information stored in their memory, and the one or more lighting modules can illuminate and the one or more control adapters can cause their associated lamps 700 to illuminate in accordance with the previously downloaded instructions for theme X that are stored in the memory of each of the lighting modules and control adapters.

At block 842, the lighting controller 102 can send the turn theme X OFF command over the two-wire path 126 to the one or more lighting modules and control adapters of the lighting system 100. At block 844, the one or more lighting modules and/or control adapters can receive and decode the turn theme X OFF command from the data encoded power waveform sent over the two-wire path 126 by the lighting controller 102. The one or more lighting modules and the lamps 700 of the one or more control adapters associated with theme X turn off.

Learn Approach

The learn approach can be similar to the teach approach in that once the individual lighting modules and control adapters have stored the theme information (i.e., understand the meaning of a theme), a single command can be used to apply the theme. In the learn approach to the instant theme feature, commands to apply theme X from the lighting controller 102 are preceded by a theme-designation command. The theme-designation command can alert the lighting modules and control adapters that a particular theme is about to be applied.

Each lighting module and control adapter receives and decodes the theme-designation command, retrieves the settings from memory that are associated with the theme, if any are stored, and applies the settings immediately. The lighting modules and control adapters then "listen" to the commands that follow the theme-designation command and update their non-volatile memory with the applicable theme information from the commands, if there has been a change.

A new lighting system 100 or a new lighting module or control adapter installed in an existing lighting system will not have theme information stored in its memory. The first time a theme is applied to the lighting system, the user may observe a delay in the application of the theme to the new lighting system, the new lighting module, or the lamp associated with the control adapter. Subsequent theme applications after the initial theme application will not incur the same delay as the initial theme application because the lighting modules and control adapters have stored theme information during the initial application.

In an embodiment, the theme-designation command can include a change field that has a first value when the theme information in the lighting controller changes, and has a second value when the theme information has not been changed. Lighting modules and control adapters can determine whether the theme information has changed based on the change field. When the lighting modules and control adapters determine that the theme information has changed, they would delay applying the theme until the new information associated with the theme is received.

The learn theme implementation of the instant theme feature achieves the desired result without any action by the user, such as "teaching" the fixtures, or any autonomous action by the lighting controller that may confuse the user, such as powering the data encoded power waveform when the user is not expecting it to be powered.

Learn Approach Example Commands

Learn Approach "A" Example

In this scenario, the user could have previously programmed a theme into the lighting controller 102, and it is now time for the lighting modules to apply the theme. Examples of command sequences sent by the lighting controller 102 to the lighting modules to instruct the lighting modules to apply the theme are illustrated below.

Example of Non-Color Command Sequence

| Command | Payload(s) | Result |
| --- | --- | --- |
| Apply Theme (Theme ON Variant) | Byte1 - 01000010 (Theme "B") | Lighting modules receive this command and if the lighting modules have information stored in non-volatile memory for Theme B, the lighting modules set the LED intensity based on the stored information. Then the lighting modules receive the rest of the command sequence. |
| Queue White Intensity | Byte1 - 00001111 (Int = 15%) | Lighting modules store the payload value (15% intensity in this example) into RAM. |
| Apply Theme (Apply End Variant) | Byte1 - 00000000 | Lighting modules compare the value stored in RAM to the value stored in non-volatile memory for theme B. When the comparison indicates that the values are the same, the process stops. When the comparison indicates that the values are different, the lighting modules apply the intensity in RAM to their respective LED(s) and over-write the Theme B value in non-volatile memory with the value from RAM. |

Example of Non-Color Command Sequence

| Command | Payload(s) | Result |
| --- | --- | --- |
| Apply Theme (Theme ON Variant) | Byte1 - 01000010 (Theme "B") | Lighting modules receive this command and if the lighting modules have information stored in non-volatile memory for Theme B, the lighting modules immediately set the LEDs intensities based on the stored information. Then the lighting modules receive the rest of the command sequence. |
| Queue RGBW Intensity | Byte1 - 00001111 (white Int = 15%) Byte2 - 00000000 (red Int = 0%) Byte3 - 00100000 (green Int = 32%) Byte4 - 00101000 (blue Int = 40%) | Lighting modules store the payload values into RAM. |
| Apply Theme (Apply End Variant) | Byte1 - 00000000 | Lighting modules compare the values stored in RAM to the respective values stored in non-volatile memory for theme B. When the comparison indicates that the values are the same, the process stops. When the comparison indicates that the values are different, the lighting modules apply the intensities in RAM to the respective LEDs and over-write the Theme B values in non-volatile memory with the respective values from RAM. |

FIGS. 9A-9E are flow charts illustrating a learn process 900 to apply a lighting theme to a collection of one or more groups of lighting modules, according to certain embodiments.

At block 902, the user can enter or modify a theme Y program, and at block 904, the lighting controller 102 can store the theme Y information in its memory or update the theme Y information according to the user entered modifications.

At block 906, the user can enter the instructions to turn on theme Y at the lighting controller 102. At block 908, the lighting controller 102 can send the apply theme Y designation command over the two-wire path 126 to the one or more lighting modules and control adapters of the lighting system 100. At block 910, the one or more lighting modules and/or control adapters can receive and decode the apply theme Y designation command from the data encoded power waveform sent over the two-wire path 126 by the lighting controller 102. The one or more lighting modules and control adapters can retrieve the theme Y information stored in their memory, and the one or more lighting modules can illuminate and the one or more control adapters can cause their associated lamps 700 to illuminate in accordance with the previously downloaded instructions for theme Y that are stored in the memory of each of the lighting modules and control adapters.

At block 912, the lighting controller 102 can send theme information to the groups of one or more lighting modules and control adapters assigned or associated with theme Y in the data encoded power waveform via the two-wire path 126. In one aspect, the lighting controller 102 can send all of the theme Y information. In another aspect, the lighting controller 102 can send a portion of the theme Y information, such as settings associated with theme Y that have changed.

At block 914, the first group of one or more lighting modules and/or control adapters can download the theme Y information. For example, the first group of the one or more lighting modules and/or control adapters can receive and decode the theme Y information from the data encoded power waveform sent over the two-wire path 126 by the lighting controller 102. At block 916, the first group of the one or more lighting modules and/or control adapters can then store the theme Y information in their memory. At block 918, the first group of the one or more lighting modules and/or control adapters can illuminate according to the theme Y information retained in their memory.

At block 924, the second group of one or more lighting modules and/or control adapters can download the theme Y information. For example, the second group of the one or more lighting modules and/or control adapters can receive and decode the theme Y information from the data encoded power waveform sent over the two-wire path 126 by the lighting controller 102. At block 926, the second group of the one or more lighting modules and/or control adapters can then store the theme Y information in their memory. At block 928, the second group of the one or more lighting modules and/or control adapters can illuminate according to the theme Y information retained in their memory.

These steps are repeated for each group associated or identified in the theme Y information, until at block 934, the last group of the one or more lighting modules and/or control adapters can download the theme Y information. For example, the last group of the one or more lighting modules and/or control adapters can receive and decode the theme Y information from the data encoded power waveform sent over the two-wire path 126 by the lighting controller 102. At block 936, the last group of the one or more lighting modules and/or control adapters can then store the theme Y information in their memory. At block 938, the last group of the one or more lighting modules and/or control adapters can illuminate according to the theme Y information retained in their memory.

At block 940, the lighting controller 102 can send the turn theme Y OFF command over the two-wire path 126 to the one or more lighting modules and control adapters of the lighting system 100. At block 942, the one or more lighting modules and/or control adapters can receive and decode the turn theme Y OFF command from the data encoded power waveform sent over the two-wire path 126 by the lighting controller 102. The one or more lighting modules and the lamps 700 of the one or more control adapters associated with theme Y turn off.

Blocks 946-952 illustrate the learn approach when no new settings are entered for theme Y. The lighting system 100 can operate theme Y according to the settings stored in the memory of the one or more lighting modules and control adapters and in response to a user defined schedule or command.

At block 946, the lighting controller 102 can send the apply theme Y command over the two-wire path 126 to the one or more lighting modules and control adapters of the lighting system 100. At block 948, the lighting controller 102 can retrieve the theme Y information from memory to verify that the theme Y information has been previously downloaded.

At block 950, the one or more lighting modules and/or control adapters can receive and decode the apply theme Y command from the data encoded power waveform sent over the two-wire path 126 by the lighting controller 102. At block 952, the lighting modules and the control adapters can retrieve the theme Y information stored in their memory, and the one or more lighting modules can illuminate and the one or more control adapters can cause their associated lamps 700 to illuminate in accordance with the previously downloaded instructions for theme Y that are stored in the memory of each of the one or more lighting modules and control adapters.

At block 954, the lighting controller 102 can send the turn theme Y OFF command over the two-wire path 126 to the one or more lighting modules and control adapters of the lighting system 100. At block 956, the one or more lighting modules and/or control adapters can receive and decode the turn theme Y OFF command from the data encoded power waveform sent over the two-wire path 126 by the lighting controller 102. The lighting modules and the lamps 700 of the control adapters associated with theme Y turn off.

In an embodiment, if the user changed the definition of Theme B, for example, stored in the lighting controller 102 after the lighting modules stored or "learned" the "old" or previous Theme B definition, then when the lighting modules apply the theme a first time after the change, the lighting modules may apply the old or previous intensity values. After receiving the entire command sequence, the lighting module would apply new values. The following command sequence provides an example that can avoid this situation.

Learn Approach "B" Example

In this scenario, the user supplies the lighting controller 102 with information that the user may have adjusted the settings associated with theme B (in this example) such that the settings stored in the lighting fixtures for theme B are no longer valid and it is now time for the lighting modules to apply the theme. Examples of command sequences sent by the lighting controller 102 to the lighting modules to instruct the lighting modules to apply the theme are illustrated below.

Example of Non-Color Command Sequence

| Command | Payload(s) | Result |
| --- | --- | --- |
| Apply Theme (Theme LEARN Variant) | Byte1 - 11000010 (Theme "B") | Lighting modules receive the "11" in bits 7 and 6 and "000010" in bits 5-0 decode as new theme information for theme B. The lighting modules do not apply the setting stored in non-volatile memory. Instead, the lighting modules wait for the command sequence to complete. |
| Queue White Intensity | Byte1 - 00001111 (Int = 15%) | Lighting modules store the payload value (15% in this example) into RAM. |
| Apply Theme (Apply End Variant) | Byte1 - 00000000 | Lighting modules now set the LED to the intensity stored in RAM and over-write the Theme B non-volatile memory settings with this new value. |

Example of Color Command Sequence

| Command | Payload(s) | Result |
| --- | --- | --- |
| Apply Theme (Theme LEARN variant) | Byte1 - 11000010 (Theme "B") | Lighting modules receive the "11" in bits 7 and 6 and "000010" in bits 5-0 decode as new theme information for theme B. The lighting modules do not apply the setting stored in |

| Command | Payload(s) | Result |
|---|---|---|
| | | non-volatile memory. Instead, the lighting modules wait for the command sequence to complete. |
| Queue RGBW Intensity | Byte1 - 00001111 (white Int = 15%) Byte2 - 00000000 (red Int = 0%) Byte3 - 00100000 (green Int = 32%) Byte4 - 00101000 (blue Int = 40%) | Lighting modules store the payload values into RAM. |
| Apply Theme (Apply End Variant) | Byte1 - 00000000 | Lighting modules now set the LEDs to the respective intensities stored in RAM and over-write the respective Theme B non-volatile memory settings with these new values. |

FIGS. 10A-10E are flow charts illustrating another learn process 1000 to apply a lighting theme to a collection of one or more groups of lighting modules and control adapters, according to certain embodiments.

At block 1002, the user can enter the instructions at the lighting controller 102 to turn on theme N. The lighting controller 102 can determine whether there are any changes to the theme N program at blocks 1004 and 1006. When the user has created a new theme N program that did not exist before or modified an existing theme N program, the process 1000 moves from block 1006 to block 1006a.

Block 1006a illustrates the user entering the instructions to turn on theme N where the user has entered a new theme N program or modified an existing theme N program since the last operation to theme N, as was described above with respect to block 1006. At block 1008, the lighting controller 102 can access the lighting program in its memory. The lighting controller 102 can store the new or modified theme N information when it was input into the lighting controller 102 by the user at block 1006. The lighting controller 102 can send theme N information to the groups of one or more lighting modules and control adapters assigned or associated with theme N in the data encoded power waveform via the two-wire path 126.

At block 1010, the first group of one or more lighting modules and/or control adapters can download the theme N information. For example, the first group of the one or more lighting modules and/or control adapters can receive and decode the theme N information from the data encoded power waveform sent over the two-wire path 126 by the lighting controller 102.

In one aspect, at block 1012, the first group of the one or more lighting modules and/or control adapters can then store the theme N information in their memory. At block 1014 the first group of the one or more lighting modules and/or control adapters can illuminate according to the theme N information retained in their memory.

In another aspect, at block 1013, the first group of the one or more lighting modules and/or control adapters can compare the new theme N information with the existing theme N information stored in their memory. If the theme N information for the first group of the one or more lighting modules and control adapters has not changed, the first group of one or more lighting modules and/or control adapters can illuminate according to the theme N information retained in their memory.

At block 1020, the second group of one or more lighting modules and/or control adapters can download the theme N information. For example, the second group of the one or more lighting modules and/or control adapters can receive and decode the theme N information from the data encoded power waveform sent over the two-wire path 126 by the lighting controller 102.

In one aspect, at block 1022, the second group of the one or more lighting modules and/or control adapters can then store the theme N information in their memory. At block 1024 the second group of the one or more lighting modules and/or control adapters can illuminate according to the theme N information retained in their memory.

In another aspect, at block 1023, the second group of the one or more lighting modules and/or control adapters can compare the new theme N program with the existing program stored in their memory. If the theme N information for the second group of one or more lighting modules and control adapters has not changed, the second group of the one or more lighting modules and/or control adapters can illuminate according to the theme N information retained in their memory.

These steps are repeated for each group of one or more lighting modules and control adapters associated or identified in the theme N information, until at block 1030, the last group of the one or more lighting modules and/or control adapters can download the theme N information. For example, the last group of the one or more lighting modules and/or control adapters can receive and decode the theme N information from the data encoded power waveform sent over the two-wire path 126 by the lighting controller 102.

In one aspect, at block 1032, the last group of the one or more lighting modules and/or control adapters can then store the theme N information in memory. At block 1034 the last group of one or more lighting modules and/or control adapters can illuminate according to the theme N information retained in their memory.

In another aspect, at block 1033, the last group of the one or more lighting modules and/or control adapters can compare the new theme N program with the existing program stored in their memory. If the theme N program for the last group of the one or more lighting modules and control adapters has not changed, the last group of the one or more lighting modules and/or control adapters can illuminate according to the theme N information retained in their memory.

At block 1036, the lighting controller 102 can send the turn theme N OFF command over the two-wire path 126 to the one or more lighting modules and control adapters of the lighting system 100. At step 1038, the one or more lighting modules and/or control adapters can receive and decode the turn theme N OFF command from the data encoded power waveform sent over the two-wire path 126 by the lighting controller 102. The one or more lighting modules and the lamps 700 of the one or more control adapters associated with theme N turn off.

Referring to blocks 1002, 1004, 1006, the user can enter the command at the lighting controller 102 to turn on theme N at block 1002 and the lighting controller 102 determines whether there are any changes to the theme N program at blocks 1004 and 1006. When the user has not modified an existing theme N program, the process 1000 moves from block 1004 to block 1004a.

Block 1004a illustrates the user entering the instructions turn on theme N where the user has not made any changes to the theme N program, as was described above with respect to block 1004. At block 1040, the lighting controller 102 can access the lighting program in its memory. The lighting controller 102 can send the turn on theme N-no changes command in the data encoded power waveform via the two-wire path 126 to the one or more lighting modules and/or control adapters in communication with the lighting controller 102.

At block 1042, the one or more lighting modules and/or control adapters in communication with the lighting controller 102 receive and decode the turn on theme N—no changes command from the lighting controller 102.

In one aspect, at block 1044, the one or more lighting modules and/or control adapters with theme N information retained in their memory illuminate in accordance with the theme N information retained in their memory.

In another aspect, at block 1045, the lighting controller 102 can send the theme N information to the one or more lighting modules and/or control adapters after sending the turn on theme N—no changes command. The one or more lighting modules and/or control adapters can receive and store the theme N information in their memory. This can insure that the one or more lighting modules and/or control adapters are illuminating according to the theme N information.

At block 1046, the lighting controller 102 can send the turn theme N OFF command over the two-wire path 126 to the one or more lighting modules and control adapters of the lighting system 100. At step 1048, the one or more lighting modules and/or control adapters can receive and decode the turn theme N OFF command from the data encoded power waveform sent over the two-wire path 126 by the lighting controller 102. The one or more lighting modules and the lamps 700 of the one or more control adapters associated with theme N turn off.

Terminology

It should be noted that in any of these implementations what is described as several messages can be combined into one, or what is described as one message can be broken into several.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system to manage lighting themes in a plurality of lighting modules, the system comprising:
    a lighting controller configured to receive AC power from a primary AC power source and user input indicative of lighting theme information and generate a data encoded power signal to provide power and encoded messages based on the lighting theme information over a two-wire network, the lighting theme information including a request to implement a lighting theme of a plurality of lighting themes; and a plurality of lighting modules, each lighting module of the plurality of lighting modules configured to receive the data encoded power signal over the two-wire network, each lighting module including at least one lamp, lamp driver circuitry, a microprocessor, and memory storing instructions, that when executed by the processor, configure each lighting module to:

decode at least a portion of the encoded message, the at least a portion including an indication of the requested lighting theme;

retrieve one or more stored settings for the at least one lamp that are associated with the requested lighting theme from the memory; and execute the retrieved settings.

2. The system of claim 1 wherein the lighting theme information further includes commands based on the user input to implement the requested lighting theme.

3. The system of claim 2 wherein the instructions further configure each lighting module to decode a second portion of the encoded message after executing the retrieved settings associated with the requested lighting theme, the second portion of the encoded message including the commands based on the user input.

4. The system of claim 3 wherein the instructions further configure each lighting module to compare the commands based on the user input from the decoded second portion with the one or more stored settings to determine changes in the requested lighting theme.

5. The system of claim 4 wherein the instructions further configure each lighting module to revise the one or more stored settings based on the determined changes in the requested lighting theme.

6. The system of claim 4 wherein the instructions further configure each lighting module to execute the commands based on the user input from the decoded second portion when the comparison indicates changes in the requested lighting theme.

7. The system of claim 6 wherein the instructions further configure each lighting module to replace the one or more stored settings in the memory with the commands based on the user input from the decoded second portion.

8. The system of claim 1 wherein the at least one lamp is an LED, an incandescent light, a low voltage light, or a line voltage light.

9. The system of claim 1 wherein the commands provide indications to control one or more of ON/OFF times, color, color temperature, or intensity of the at least one lamp.

10. A lighting module comprising:
at least one lamp;
a microprocessor, and
memory storing instructions, that when executed by the microprocessor, cause the lighting module to:
receive a data encoded power signal over a two-wire network, the data encoded power signal providing power and encoded messages, the encoded messages including lighting theme information indicative of a lighting theme of a plurality of lighting themes;

decode at least a portion of the received message, the at least a portion including an indication of the lighting theme; and execute one or more settings stored in the memory for the at least one lamp and associated with the lighting theme based on the indication of the lighting theme.

11. The lighting module of claim 10 wherein the instructions further cause the lighting module to decode a second portion of the encoded message after executing the stored settings associated with the lighting theme, the second portion of the encoded message including commands associated with the lighting theme information.

12. The lighting module of claim 11 wherein the instructions further cause the lighting module to compare the commands from the decoded second portion with the stored settings to determine changes in the lighting theme.

13. The lighting module of claim 12 wherein the instructions further cause the lighting module to store in the memory the determined changes in the lighting theme.

14. The lighting module of claim 12 wherein the instructions further cause the lighting module to implement the commands from the decoded second portion when the comparison indicates changes in the lighting theme.

15. The lighting module of claim 10 wherein each lighting module of the plurality of lighting modules is addressable.

16. A method to manage lighting themes in lighting modules, the method comprising:
receiving at a plurality of lighting modules a data encoded power signal over a two-wire network, the data encoded power signal providing power and encoded messages, the encoded messages including lighting theme information indicative of a lighting theme of a plurality of lighting themes;

decoding, with at least one lighting module of the plurality of lighting modules, at least a portion of the received message, the at least a portion including an indication of the lighting theme, the at least one lighting module comprising memory and at least one lamp; and applying, with the at least one lighting module, one or more settings stored in the memory for the at least one lamp and associated with the lighting theme.

17. The method of claim 16 further comprising decoding, with the at least one lighting module, a second portion of the encoded message after applying the stored settings associated with the lighting theme, the decoded second portion including commands associated with the lighting theme.

18. The method of claim 17 further comprising comparing, with the at least one lighting module, the commands from the decoded second portion with the stored settings to determine changes in the lighting theme.

19. The method of claim 18 further comprising applying, with the at least one lighting module, the commands from the decoded second portion when the comparison indicates changes in the lighting theme.

20. The method of claim 18 further comprising, with the at least one lighting module, over-writing the stored settings in the memory with the commands from the decoded second portion when the comparison indicates changes in the lighting theme.

* * * * *